United States Patent
Takeo

(10) Patent No.: US 12,516,502 B2
(45) Date of Patent: Jan. 6, 2026

(54) SHOVEL, INFORMATION PROCESSING APPARATUS, AND RECORDING MEDIUM

(71) Applicant: SUMITOMO CONSTRUCTION MACHINERY CO., LTD., Tokyo (JP)

(72) Inventor: Jitsutaka Takeo, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 237 days.

(21) Appl. No.: 17/929,789

(22) Filed: Sep. 6, 2022

(65) Prior Publication Data

US 2022/0412054 A1  Dec. 29, 2022

Related U.S. Application Data

(63) Continuation of application No. PCT/JP2021/011616, filed on Mar. 22, 2021.

(30) Foreign Application Priority Data

Mar. 23, 2020  (JP) .................................. 2020-051713

(51) Int. Cl.
  *E02F 9/20*  (2006.01)
  *B60L 1/00*  (2006.01)
  (Continued)

(52) U.S. Cl.
  CPC ............ *E02F 9/2091* (2013.01); *B60L 58/12* (2019.02); *E02F 9/2004* (2013.01); *E02F 9/205* (2013.01);
  (Continued)

(58) Field of Classification Search
  CPC ....... E02F 9/2091; E02F 9/2004; E02F 9/205; E02F 9/2271; E02F 9/261; E02F 9/2228;
  (Continued)

(56) References Cited

U.S. PATENT DOCUMENTS

| | | | |
|---|---|---|---|
| 11,258,107 B2 * | 2/2022 | Austin | B60L 53/38 |
| 2014/0214253 A1 * | 7/2014 | Inoue | B60L 58/15 |
| | | | 701/22 |

(Continued)

FOREIGN PATENT DOCUMENTS

| | | | |
|---|---|---|---|
| CN | 105023196 A | * 11/2015 | |
| CN | 108370432 A | * 8/2018 | B64C 27/08 |

(Continued)

OTHER PUBLICATIONS

English Translation CN105023196A (Year: 2024).*
International Search Report for PCT/JP2021/011616 mailed on May 25, 2021.

*Primary Examiner* — Rami Khatib
(74) *Attorney, Agent, or Firm* — IPUSA, PLLC

(57) ABSTRACT

A disclosed shovel includes a hydraulic pump, a hydraulic actuator driven by hydraulic fluid supplied from the hydraulic pump, an electric motor configured to drive the hydraulic pump, a power storage device configured to be chargeable with power from an external power source to supply driving power to the electric motor, an input device configured to receive input from a user, an imaging device configured to acquire information about surroundings of the shovel, and a control device configured to set a target value of a charge amount of the power storage device, the power storage device being charged with power supplied from the external power source, in response to a predetermined input received by the input device.

18 Claims, 6 Drawing Sheets

(51) Int. Cl.
*B60L 58/12* (2019.01)
*E02F 9/22* (2006.01)
*E02F 9/26* (2006.01)
*H01M 10/44* (2006.01)
*H02J 7/00* (2006.01)

(52) U.S. Cl.
CPC ............ *E02F 9/2271* (2013.01); *E02F 9/261* (2013.01); *H01M 10/44* (2013.01); *H02J 7/0047* (2013.01); *B60L 1/003* (2013.01); *B60L 2200/40* (2013.01); *B60L 2250/16* (2013.01); *E02F 9/2228* (2013.01); *E02F 9/2285* (2013.01); *E02F 9/2292* (2013.01); *E02F 9/2296* (2013.01); *H01M 2220/20* (2013.01)

(58) Field of Classification Search
CPC ..... E02F 9/2285; E02F 9/2292; E02F 9/2296; E02F 9/2054; E02F 9/207; E02F 9/267; E02F 3/841; E02F 9/00; B60L 58/12; B60L 1/003; B60L 2200/40; B60L 2250/16; H01M 10/44; H01M 2220/20; H01M 10/48; H02J 7/0047; H02J 7/00034; H02J 7/0048; H02J 2310/48; H02J 7/00712; Y02E 60/10
See application file for complete search history.

(56) References Cited

U.S. PATENT DOCUMENTS

| | | | |
|---|---|---|---|
| 2017/0097755 A1* | 4/2017 | McAravey | G06Q 50/06 |
| 2019/0160956 A1* | 5/2019 | Ichikawa | H02J 3/322 |
| 2020/0018800 A1* | 1/2020 | Oshima | G07C 3/00 |
| 2020/0047687 A1* | 2/2020 | Camhi | G10L 15/22 |
| 2020/0055419 A1* | 2/2020 | Kim | G06Q 10/02 |
| 2020/0399863 A1 | 12/2020 | Aizawa et al. | |
| 2020/0410606 A1* | 12/2020 | Radu | G06Q 10/109 |
| 2021/0004879 A1* | 1/2021 | Nakajima | G06Q 30/0283 |
| 2021/0116927 A1* | 4/2021 | Kang | G05D 1/0217 |
| 2021/0222399 A1* | 7/2021 | Nomura | E02F 9/22 |
| 2022/0002969 A1* | 1/2022 | Onodera | E02F 9/2075 |
| 2022/0268592 A1* | 8/2022 | Iguchi | G01C 21/3484 |
| 2023/0122119 A1* | 4/2023 | Wu | G05D 1/0289 701/301 |
| 2024/0083265 A1* | 3/2024 | Takaki | B60L 1/003 |

FOREIGN PATENT DOCUMENTS

| | | | | |
|---|---|---|---|---|
| JP | 2013-009539 | | 1/2013 | |
| JP | 2014-014239 | | 1/2014 | |
| JP | 2014-107929 | | 6/2014 | |
| JP | 2014-148879 | | 8/2014 | |
| JP | 2015161217 A | * | 9/2015 | |
| JP | 2016-075072 | | 5/2016 | |
| JP | 2016-140193 | | 8/2016 | |
| WO | WO-2016194941 A1 | * | 12/2016 | ............ B60K 6/24 |
| WO | 2019/172424 | | 9/2019 | |

* cited by examiner

FIG.6

CHARGING LOGS 6000

| DATE | CHARGING TIME PERIOD | CHARGING MODE | SETTING MODE | TARGET CHARGE AMOUNT | | PREVIOUS DISCHARGE AMOUNT | DETERI-ORATION DEGREE |
|---|---|---|---|---|---|---|---|
| Dec 21, 2020 | 18:00–0:35 the following day | Normal | Automatic | Moderate | 70% | xxx | xxxx |
| Dec 22, 2020 | 17:30–2:50 the following day | Normal | Manual | — | 85% | xxx | xxxx |
| Dec 23, 2020 | 18:00–23:45 | Normal | Automatic | Small | 60% | xxx | xxxx |
| Dec 24, 2020 | 12:10–12:50 | Rapid | Manual | — | 65% | xxx | xxxxx |
| Dec 24, 2020 | 17:30–4:30 the following day | Normal | Automatic | Full | 100% | xxx | xxxx |
| Dec 25, 2020 | 18:00–1:00 the following day | Normal | Automatic | Moderate | 75% | xxx | xxxx |
| Dec 28, 2020 | 18:00–3:10 the following day | Normal | Automatic | Large | 85% | xxx | xxxx |
| Jan 07, 2021 | 18:00–3:10 the following day | Normal | Automatic | Large | 83% | xxx | xxxx |
| Jan 08, 2021 | 18:00–0:35 the following day | Normal | Automatic | Moderate | 72% | xxx | xxxx |
| Jan 12, 2021 | 18:10–3:30 the following day | Normal | Automatic | Large | 86% | xxx | xxxx |
| Jan 13, 2021 | 17:30–3:00 the following day | Normal | Automatic | Large | 85% | xxx | xxxx |
| Jan 14, 2021 | 18:00–0:35 the following day | Normal | Automatic | Moderate | 75% | xxx | xxxx |
| Jan 14, 2021 | 12:05–12:40 | Rapid | Manual | — | 60% | xxx | xxxx |
| Jan 15, 2021 | 18:00– currently charging | Normal | Automatic | Large | 85% | xxx | xxxx |

6100  6200

SHOVEL, INFORMATION PROCESSING APPARATUS, AND RECORDING MEDIUM

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2021/011616, filed on Mar. 22, 2021, and designating the U.S., which claims priority to Japanese Patent Application No. 2020-051713 filed on Mar. 23, 2020. The entire contents of the foregoing applications are incorporated herein by reference.

BACKGROUND

Technical Field

The present disclosure relates to a shovel and the like.

Description of Related Art

For example, a shovel driven by the power of a power storage device (e.g., batteries), which is chargeable from an external power source is known.

SUMMARY

An aspect of the present disclosure provides a shovel that includes
  a hydraulic pump;
  a hydraulic actuator driven by hydraulic fluid supplied from the hydraulic pump;
  an electric motor configured to drive the hydraulic pump;
  a power storage device configured to be chargeable with power from an external power source to supply driving power to the electric motor;
  an input device configured to receive input from a user;
  an imaging device configured to acquire information about surroundings of the shovel; and
  a control device configured to set a target value of a charge amount of the power storage device, the power storage device being charged with power supplied from the external power source, in response to a predetermined input received by the input device.

Another aspect of the present disclosure provides an information processing apparatus that includes
  a communication device configured to communicate with an outside, the outside including a shovel including a hydraulic pump, a hydraulic actuator driven by hydraulic oil supplied from the hydraulic pump, an electric motor configured to drive the hydraulic pump, a power storage device configured to be chargeable with power from an external power source to supply driving power to the electric motor, and an imaging device configured to acquire information about surroundings of the shovel;
  an input device configured to receive a predetermined input from a user; and
  a memory and one or more processors configured to set a target value of the charge amount of the power storage device with power supplied from the external power source, in response to the predetermined input received from the input device, wherein the communication device transmits the set target value toward the shovel.

Still another aspect of the present disclosure provides a non-transitory computer-readable recording medium storing a program including instructions, which when executed by one or more processors of an information processing apparatus, causes the information processing apparatus to execute a process, wherein the information processing apparatus includes a communication device configured to communicate with an outside, an input device configured to receive a predetermined input from a user, and a memory and the one or more processors, the outside including a shovel including a hydraulic pump, a hydraulic actuator driven by hydraulic oil supplied from the hydraulic pump, an electric motor configured to drive the hydraulic pump, a power storage device configured to be chargeable with power from an external power source to supply driving power to the electric motor, and an imaging device configured to acquire information about surroundings of the shovel, wherein the process includes:
  setting a target value of the charge amount of the power storage device with power supplied from the external power supply, in response to the predetermined input received from the input device; and
  transmitting the set target value toward the shovel through the communication.

BRIEF DESCRIPTION OF THE DRAWINGS

FIG. 6 is a diagram illustrating an example of a confirmation screen relating to charging results and charging statuses of the power storage device.

EMBODIMENT OF THE INVENTION

For example, a shovel driven by the power of a power storage device (e.g., batteries), which is chargeable from an external power source is known.

However, if the power storage device is charged up to the full charged state every time after work is completed, the power storage device may be fully charged even though, depending on the nature of the next work, the charge amount up to the full charge state is not necessary. This may cause the deterioration of the power storage device to progress. On the other hand, it is possible to control the charge amount of the power storage device so as not to allow the charge amount to reach the full charge state. However, in such a case, there is a possibility that, depending on the nature of the next work, the charge amount of the power storage device may not be retained until the end of the next work.

Accordingly, in view of the above-described issues, it is an aspect of the present invention to provide a technology capable of more appropriately charging a power storage device installed in a shovel, which is driven by the power storage device chargeable with power from an external power source.

Hereinafter, embodiments of the invention will be described with reference to the accompanying drawings.

[Overview of Shovel Management System]

First, an overview of a shovel management system SYS will be described with reference to FIG. 1.

Figure 1:
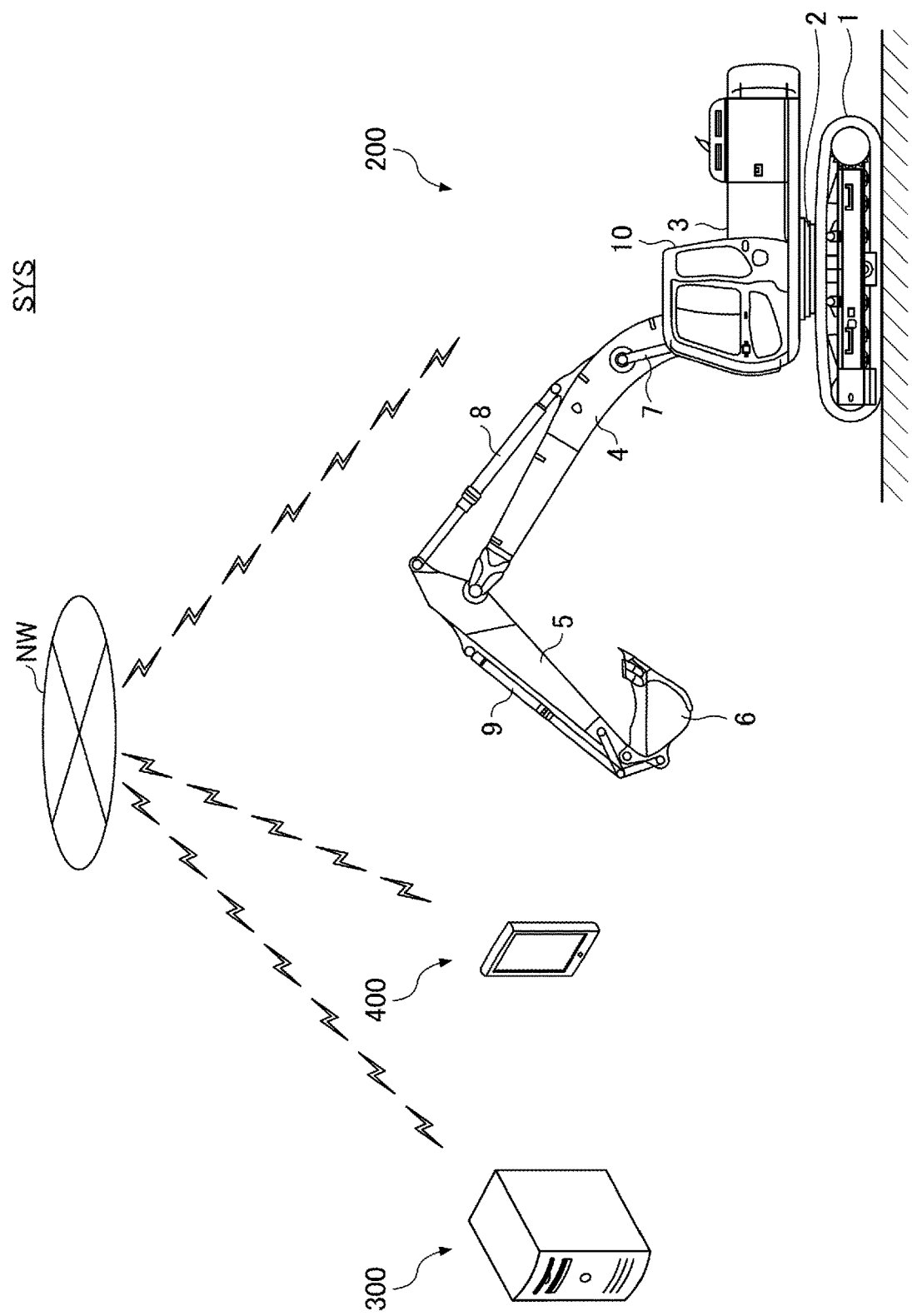
FIG. 1 is a schematic diagram illustrating an example of a shovel management system.

FIG. 1 is a schematic diagram illustrating an example of a shovel management system SYS according to an embodiment.

As illustrated in FIG. 1, the shovel management system SYS includes a shovel 200, a management device 300, and a support device 400.

For example, the shovel management system SYS may collect various data relating to the shovel 200 transmitted (uploaded) from the shovel 200 in the management device 300.

The shovel management system SYS may, for example, provide data collected by the management device 300, secondary data (information) generated from the collected data, and the like to a user in the support device 400. The user of the shovel management system SYS includes, for example, a user (hereinafter referred to as a "shovel user") of the shovel 200. The shovel user includes an operator of the shovel 200, an owner of the shovel 200, a service person who performs maintenance of the shovel 200, and the like. The user of the shovel management system SYS includes, for example, a user (hereinafter referred to as a "management device user") of the management device 300. The management device user also includes, for example, a manager of the management device 300, a worker, a developer of the shovel 200, and the like. The user of the shovel management system SYS further includes a user (hereinafter referred to as a "support device user") of the support device 400. The support device user includes an operator of the shovel 200, a supervisor or a worker of a work site, a manager or a worker of the management device 300, a service person in charge of maintenance of the shovel 200, an owner of the shovel 200, and the like.

Further, the shovel management system SYS may pertain various settings relating to the control of the shovel 200 in response to an input from a user or automatically in the management device 300 or the support device 400, for example, and may transmit the settings to the shovel 200. Thus, various operations of the shovel 200 can be controlled and monitored from the management device 300 and the support device 400.

The shovel management system SYS may include one or a plurality of shovels 200. Thus, the shovel management system SYS can collect data for the plurality of shovels 200, provide information to the user based on the collected data, set the control of the shovel 200, and the like.

The shovel management system SYS may include one or more management devices 300. Thus, the shovel management system SYS can provide various functions distributed by the plurality of management devices 300.

The support device 400 included in the shovel management system SYS may be one or a plurality of support devices. Thus, the shovel management system SYS can provide information relating to the shovel 200 to a plurality of users who use the respective support devices 400.

<Overview of Shovel>

The shovel 200 according to the present embodiment includes a lower traveling body 1, an upper turning body 3 mounted on the lower traveling body 1 so as to be able to turn via a turning mechanism 2, a boom 4, an arm 5, and a bucket 6 as attachments, and a cabin 10 in which an operator boards.

The lower traveling body 1 includes, for example, a pair of right and left crawlers, and each crawler is hydraulically driven by the traveling hydraulic motors LA and 1B (see FIG. 2), so that the lower traveling body 1 moves on its own.

The upper turning body 3 turns with respect to the lower traveling body 1 by being electrically driven by a turning motor 21 (see FIG. 2) to be described later, for example, through the turning mechanism 2. The upper turning body 3 may be hydraulically driven by a turning hydraulic motor instead of the turning motor 21 through the turning mechanism 2, for example. In this case, the shovel 200 of the present embodiment corresponds to a structure in which the power source (engine) of a so-called hydraulic shovel, in which all driven elements are hydraulically driven by hydraulic oil supplied from a main pump 14 (see FIG. 2) powered by a pump motor 12, is replaced by a pump motor 12.

The boom 4 is attached to the front center of the upper turning body 3 so as to be able to ascend, the arm 5 is attached to the tip of the boom 4 so as to be able to rotate up and down, and the bucket 6 is attached to the tip of the arm 5 so as to be able to rotate up and down. The boom 4, the arm 5 and the bucket 6 are hydraulically driven by a boom cylinder 7, an arm cylinder 8 and a bucket cylinder 9 as hydraulic actuators, respectively.

The bucket 6 is an example of an end attachment, and another end attachment may be attached to the tip of the arm 5 in place of the bucket 6 according to the work contents or the like. Other end attachments may be different types of buckets from the bucket 6, such as, for example, a slope bucket, a dredging bucket, and the like. Other end attachments may be different types of end attachments from, for example, buckets such as breakers, agitators, and grapplers.

The cabin is mounted on the front left side of the upper turning body 3, and an operator's seat in which an operator sits and an operation device 26, which will be described later, are provided in the cabin 10.

As will be described later, the cabin 10 may be omitted when the shovel 200 is remotely operated or operated by a full-automatic operation function.

The shovel 200 operates driven elements such as the lower traveling body 1 (left and right crawlers), the upper turning body 3, the boom 4, the arm 5, and the bucket 6 in response to the operation of an operator on board the cabin 10.

The shovel 200 may be configured to be operable by an operator on board the cabin 10, or may be configured to be operable remotely from outside the shovel. If the shovel 200 is remotely operated, the interior of the cabin 10 may be unmanned. Hereinafter, description will be made on the assumption that the operator's operation includes at least one of the operation by the operator of the cabin 10 with respect to the operation device 26, and the remote operation by an external operator.

Remote control includes, for example, a mode in which the shovel 200 is operated by an operation input relating to an actuator of the shovel 200 performed by a predetermined external device. The predetermined external device may be, for example, a management device 300 or a support device 400. In this case, the shovel 200 may, for example, transmit image information (captured image) output from an imaging device included in a peripheral information acquisition device 40 described later to an external device via a communication device 60 described later. The external device may cause a display device (hereinafter referred to as "remotely operated display device") provided in the external device to display image information (captured image)

received. Various information images (information screens) displayed on the output device 50 (a display device 50A described later) inside the cabin 10 of the shovel 200 may also be displayed on a remotely operated display device of an external device. Thus, an operator of the external device can remotely operate the shovel 200 while confirming display contents such as a captured image and an information screen representing a state of the surroundings of the shovel 200 displayed on the remotely operated display device, for example. The shovel 200 may operate an actuator to drive driven elements such as the lower traveling body 1 (left and right crawlers), the upper turning body 3, the boom 4, the arm 5, and the bucket 6 in response to a remote control signal representing the contents of the remote control received from the external device by the communication device 60.

The remote operation may include a mode in which the shovel 200 is operated, for example, by voice input or gesture input from the outside to the shovel 200 by a person (e.g., a worker) around the shovel 200. Specifically, the shovel 200 recognizes voices uttered by surrounding workers, gestures performed by workers, and the like through a voice input device (e.g., a microphone), a gesture input device (e.g., an imaging device), and the like installed in the shovel 200 (itself). The shovel 200 may operate an actuator to drive driven elements such as the lower traveling body 1 (left and right crawlers), the upper turning body 3, the boom 4, the arm 5, and the bucket 6 according to the recognized contents of voice, gesture, etc.

The shovel 200 may automatically operate the actuator regardless of the contents of the operation by the operator. Thus, the shovel 200 implements a function of automatically operating at least a part of driven elements such as the lower traveling body 1, the upper turning body 3, the boom 4, the arm 5, and the bucket 6 (so-called "automatic driving function" or "MC (machine control) function").

The automatic operation function may include a function for automatically operating a driven element (actuator) other than a target driven element (actuator) subject to operation (so-called "semi-automatic operation function" or "operation support MC function"), in response to an operator's operation or remote operation of the operation device 26. The automatic operation function may include a function for automatically operating at least a part of the plurality of driven elements (hydraulic actuators) (so-called "full-automatic operation function" or "full-automatic MC function") on the assumption that the operator does not operate or remotely operate the operation device 26. In the shovel 200, when the full-automatic driving function is effective, the interior of the cabin 10 may be in an unmanned state. The semi-automatic operation function, the full-automatic operation function, and the like may include a mode in which the operation content of the driven element (hydraulic actuator) to be subjected to automatic operation is automatically determined according to a predetermined rule. The semi-automatic operation function, the full-automatic operation function, and the like may include a mode (so-called "automatic operation function") in which the shovel 200 autonomously makes various decisions and the operation contents of the driven element (hydraulic actuator) to be operated autonomously is determined according to the decision result.

As will be described later, the shovel 200 includes a communication device 60 to communicate with the management device 300 through a communication line NW. Thus, the shovel 200 can transmit data relating to the shovel 200 (itself) to the management device 300 or receive data relating to the control of the shovel 200 (itself).

The communication line NW includes, for example, a wide area network (WAN). The wide area network may include, for example, a mobile communication network including a base station as a terminal. The wide area network may include, for example, a satellite communication network using a communication satellite. The wide area network may include, for example, the Internet network. The communication line NW includes, for example, an internal local area network (LAN) such as a facility where the management device 300 is installed. The local network may be wired, wireless, or both. The communication line NW may include, for example, a wireless near field communication line such as WiFi or Bluetooth®.

The shovel 200 may communicate with the support device 400 through the communication line NW. In this case, the shovel 200 may indirectly communicate with the support device 400 via the management device 300, or may directly communicate with the support device 400.

[Overview of Management Device]

The management device 300 is provided outside the shovel 200 and manages, for example, an operating state and a management state of the shovel 200.

The management device 300 is, for example, a cloud server installed in a management center outside the work site of the shovel 200. The management device 300 may be, for example, an edge server installed in a temporary office in the work site of the shovel 200, a station building near the work site, a base station, or the like. The management device 300 may be, for example, a stationary terminal device (stationary terminal) or a mobile terminal device (mobile terminal) arranged in a temporary office or the like in the work site of the shovel 200. The stationary terminal may include, for example, a desktop computer terminal. The mobile terminal may include, for example, a mobile telephone, a smartphone, a tablet terminal, a laptop computer terminal, and the like.

The management device 300 communicates with each of the shovel 200 and the support device 400 through the communication line NW. Thus, the management device 300 can collect various data relating to the shovel 200 by receiving various data transmitted (uploaded) from the shovel 200, for example. The management device 300 can control the shovel 200 from the outside by transmitting data relating to the control of the shovel 200 to the shovel 200, for example. The management device 300 can provide various data to the support device 400 in response to a request from the support device 400, for example.

<Overview of Support Device>

The support device 400 is, for example, a terminal device (user terminal) used by a user who receives information provision in the shovel management system SYS.

The support device 400 is, for example, a general-purpose mobile terminal such as a laptop computer terminal, a tablet terminal, or a smartphone owned by a user. The support device 400 may be a general-purpose stationary terminal such as a desktop computer. The support device 400 may be a dedicated terminal device (mobile terminal or stationary terminal) for receiving data (information) about the shovel 200.

The support device 400 communicates with the management device 300 through a communication line NW. Thus, the support device 400 can request the management device 300 to provide data relating to the shovel 200. In addition, the support device 400 can receive data relating to the shovel 200 transmitted from the management device 300 and provide information relating to the shovel 200 to the user through an output device 330 (described later) installed in the support device.

The support device 400 may communicate with the shovel 200 through the communication line NW. In this case, the support device 400 may communicate indirectly with the shovel 200 or directly with the shovel 200 via the management device 300.

[Shovel Management System Configuration]

Next, the configuration of the shovel management system SYS according to the present embodiment will be described with reference to FIGS. 2 and 3 in addition to FIG. 1.

Figure 2:
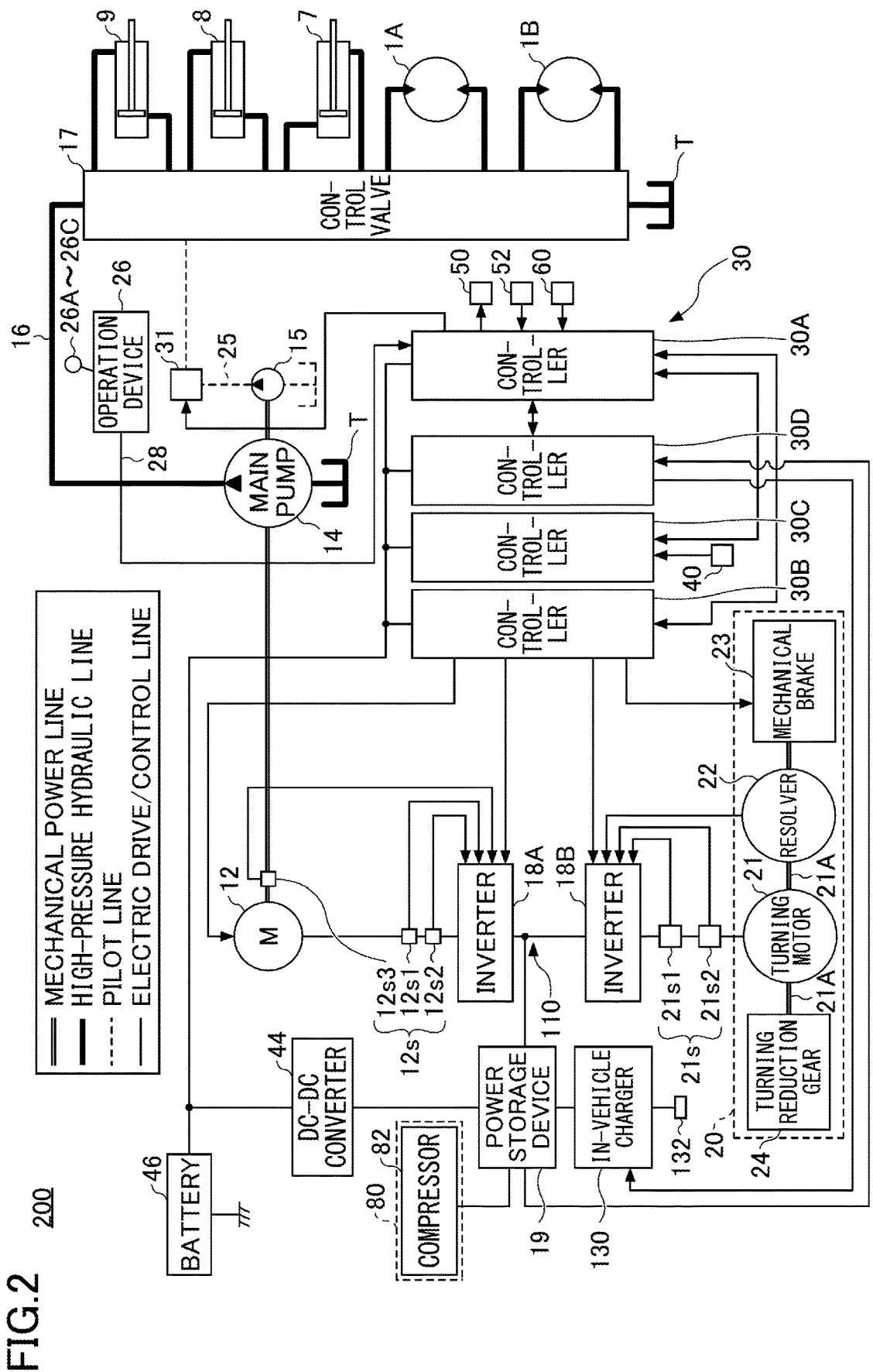
FIG. 2 is a block diagram schematically illustrating an example of a hardware configuration of a shovel.

FIG. 2 is a block diagram schematically illustrating an example of a hardware configuration of the shovel 200 according to the present embodiment. FIG. 3 is a functional block diagram illustrating an example of a functional configuration of the shovel management system SYS according to the present embodiment.

In the drawings, the mechanical power line is represented by a double line, the high-pressure hydraulic line by a thick solid line, the pilot line by a broken line, and the electric drive/control line by a thin solid line.

<Shovel Configuration>

The shovel 200 includes components such as a hydraulic drive system for hydraulically driving a driven element, an operation system for operating the driven element, a user interface system for exchanging information with a user, a communication system for communicating with the outside, and a control system for various controls.

<<Hydraulic Drive System>>

As illustrated in FIG. 2, a hydraulic drive system of the shovel 200 according to the present embodiment includes a plurality of hydraulic actuators, such as traveling hydraulic motors 1A and 1B, the boom cylinder 7, the aim cylinder 8, and the bucket cylinder 9 for hydraulically driving each of driven elements such as a lower traveling body 1, a boom 4, an arm 5, and a bucket 6. When the upper turning body 3 is hydraulically driven, the plurality of hydraulic actuators further include a turning hydraulic motor. The hydraulic drive system of the shovel 200 according to the present embodiment includes a pump motor 12, a main pump 14, and a control valve 17.

The pump motor 12 (an example of a motor) is a power source of a hydraulic drive system. The pump motor 12 is, for example, an IPM (Interior Permanent Magnet) motor. The pump motor 12 is connected to a high-voltage power source including the power storage device 19 and a turning motor 21 via an inverter 18A. The pump motor 12 is powered by three-phase AC power supplied from the power storage device 19 and the turning motor 21 via the inverter 18A to drive the main pump 14 and the pilot pump 15. The drive control of the pump motor 12 may be performed by the inverter 18A under the control of the controller 30B, which will be described later.

The main pump 14 sucks the hydraulic oil from a hydraulic oil tank T and delivers the hydraulic oil to the high-pressure hydraulic line 16, thereby supplying the hydraulic oil to the control valve 17 through the high-pressure hydraulic line 16. The main pump 14 is driven by a pump motor 12. The main pump 14 is, for example, a variable displacement hydraulic pump, and a regulator (not illustrated) controls the angle (tilt angle) of the swash plate under the control of a controller 30A, which will be described later. Thus, the main pump 14 can control the discharge flow rate (discharge pressure) by adjusting the stroke length of the piston.

The control valve 17 is a hydraulic control device for controlling a hydraulic drive system according to an operation command corresponding to an operation by an operator or an automatic operation function. As described above, the control valve 17 is connected to the main pump 14 via the high-pressure hydraulic line 16, and is configured to selectively supply hydraulic oil supplied from the main pump 14 to a plurality of hydraulic actuators. For example, the control valve 17 is a valve part including a plurality of hydraulic control valves (direction switching valves) for controlling the flow rate and flow direction of the hydraulic fluid supplied from the main pump 14 to each of the hydraulic actuators. The hydraulic oil supplied from the main pump 14 and flowing through the control valve 17 and the hydraulic actuator is discharged from the control valve 17 to the hydraulic oil tank T.

<<Electric Drive System>>

As illustrated in FIG. 2, an electric drive system of the shovel 200 according to the present embodiment includes a pump motor 12, a sensor 12s, and an inverter 18A. The electric drive system of the shovel 200 according to the present embodiment also includes a turning drive device 20, a sensor 21s, and an inverter 18B. The electric drive system of the shovel 200 according to the present embodiment includes a power storage device 19 and an in-vehicle charger 130.

The sensor 12s includes a current sensor 12s1, a voltage sensor 12s2, and a rotation state sensor 12s3.

The current sensor 12s1 detects respective currents of three phases (U, V, and W phases) of the pump motor 12. The current sensor 12s1 is provided, for example, in a power path between the pump motor 12 and the inverter 18A. The detection signals corresponding to the respective currents of the three phases of the pump motor 12 detected by the current sensor 12s1 are directly taken into the inverter 18A through the communication line. The detection signal may be input to the controller 30B via the communication line and input to the inverter 18A via the controller 30B.

The voltage sensor 12s2 detects applied voltages of the three phases of the pump motor 12. The voltage sensor 12s2 is provided, for example, in a power path between the pump motor 12 and the inverter 18A. The detection signals corresponding to the applied voltages of the three phases of the pump motor 12 detected by the voltage sensor 12s2 are directly taken into the inverter 18A through the communication line. The detection signal may be taken into the controller 30B via the communication line and input to the inverter 18A via the controller 30B.

The rotation state sensor 12s3 detects a rotation state of the pump motor 12. The rotational state of the pump motor 12 includes, for example, a rotational position (rotational angle), a rotational speed, and the like. The rotation state sensor 12s3 is, for example, a rotary encoder or a resolver.

The inverter 18A drives and controls the pump motor 12 under the control of the controller 30B. The inverter 18A includes, for example, a conversion circuit for converting DC power into three-phase AC power or three-phase AC power into DC power, a drive circuit for switching and driving the conversion circuit, and a control circuit for outputting a control signal (e.g., PWM (Pulse Width Modulation) signal) for defining the operation of the drive circuit.

The control circuit of the inverter 18A controls the driving of the pump motor 12 while identifying the operation state of the pump motor 12. For example, the control circuit of the inverter 18A identifies the operating state of the pump motor 12 based on the detection signal of the rotation state sensor 12s3. The control circuit of the inverter 18A may identify the operating state of the pump motor 12 by sequentially estimating the rotation angle of the rotary shaft of the pump motor 12 based on the detection signal of the current sensor 12s1 and the detection signal of the voltage sensor 12s2 (or the voltage command value generated in the control process).

At least one of the drive circuit or the control circuit of the inverter 18A may be provided outside the inverter 18A.

The turning drive device 20 includes a turning motor 21, a resolver 22, a mechanical brake 23, and a turning reduction gear 24.

Under the control of the controller 30B and the inverter 18B, the turning motor 21 performs a power-running operation for turning and driving the upper turning body 3 and a regenerative operation for turning and braking the upper turning body 3 by generating regenerative power. The turning motor 21 is connected to a high-voltage power source (i.e., the power storage device 19) via an inverter 18B, and is driven by three-phase AC power supplied from the power storage device 19 via an inverter 18B. The turning motor 21 supplies regenerative power to the power storage device 19 and the pump motor 12 via the inverter 18B. Thereby, the power storage device 19 can be charged and the pump motor 12 for the pump can be driven by the regenerative power. The switching control between the power-running operation and the regenerative operation of the turning motor 21 may be executed by the inverter 18B under the control of the controller 30B, for example. The resolver 22, the mechanical brake 23, and the turning reduction gear 24 are connected to a rotary shaft 21A of the turning motor 21.

The resolver 22 detects the rotational state of the turning motor 21. The rotational state of the turning motor 21 includes, for example, a rotational position (rotational angle), a rotational speed, and the like. The detection signal corresponding to the rotation angle or the like detected by the resolver 22 may be directly taken into the inverter 18B through the communication line. The detection signal may be input to the controller 30B via the communication line and input to the inverter 18B via the controller 30B.

The mechanical brake 23 mechanically generates braking force to the rotary shaft 21A of the turning motor 21 under the control of the controller 30B. Thereby, the mechanical brake 23 can perform turning braking of the upper turning body 3 or maintain the stop state of the upper turning body 3.

The turning reduction gear 24 is connected to the rotary shaft 21A of the turning motor 21, and reduces the output (torque) of the turning motor 21 at a predetermined reduction ratio to increase the torque, thereby turning and driving the upper turning body 3. That is, in the power-running operation, the turning motor 21 turns and drives the upper turning body 3 via the turning reduction gear 24. The turning reduction gear 24 increases the inertial rotational force of the upper turning body 3 and transmits it to the turning motor 21 to generate regenerative power. That is, in the regenerative operation, the turning motor 21 performs regenerative power generation by the inertial rotational force of the upper turning body 3 transmitted via the turning reduction gear 24, thereby turning and braking the upper turning body 3.

The sensor 21s includes a current sensor 21s1 and a voltage sensor 21s2.

The current sensor 21s1 detects respective currents of three phases (U, V, and W phases) of the turning motor 21. The current sensor 21s1 is provided, for example, in a power path between the turning motor 21 and the inverter 18B. The detection signals corresponding to the respective currents of the three phases of the turning motor 21 detected by the current sensor 21s1 may be directly taken into the inverter 18B through the communication line. The detection signal may be taken into the controller 30B via the communication line and input to the inverter 18B via the controller 30B.

The voltage sensor 21s2 detects applied voltages of the three phases of the turning motor 21. The voltage sensor 21s2 is provided, for example, in a power path between the turning motor 21 and the inverter 18B. The detection signals corresponding to the applied voltages of the three phases of the turning motor 21 detected by the voltage sensor 21s2 are directly taken into the inverter 18B through the communication line. The detection signal may be incorporated into the controller 30B via the communication line and input to the inverter 18B via the controller 30B.

The inverter 18B drives and controls the turning motor 21 under the control of the controller 30B. The inverter 18B includes, for example, a conversion circuit for converting DC power into three-phase AC power or three-phase AC power into DC power, a drive circuit for switching and driving the conversion circuit, and a control circuit for outputting a control signal (e.g., the PWM signal) for defining the operation of the drive circuit.

For example, the control circuit of the inverter 18B performs speed feedback control and torque feedback control on the turning motor 21 based on detection signals from the current sensor 21s1, the voltage sensor 21s2, and the resolver 22.

At least one of the drive circuit or the control circuit of the inverter 18B may be provided outside the inverter 18B.

The inverters 18A and 18B may be housed in a housing, for example, and may be integrated to form an inverter unit.

When the upper turning body 3 is hydraulically driven by a turning hydraulic motor, the turning motor 21, the sensor 21s, and the inverter 18B are omitted. In this case, the turning hydraulic motor drives the upper turning body 3 via the turning reduction gear 24, and the mechanical brake 23 applies mechanical braking force to the rotary shaft of the turning hydraulic motor.

The power storage device 19 is charged (stored) by connecting an external commercial power source and the charging port 132 of the shovel 200 with a predetermined cable (hereinafter referred to as "Charging Cable"), and supplies the charged (stored) power to the pump motor 12 and the turning motor 21 via the DC (Direct Current) bus 110. The power storage device 19 charges the generated power (regenerative power) of the turning motor 21. The power storage device 19 is, for example, a lithium ion battery and has a relatively high output voltage (e.g., several hundred volts).

The power storage device 19 may include, for example, sensors for detecting various states of the power storage device 19. The sensors incorporated in the power storage device 19 include, for example, a current sensor for detecting the current of the power storage device 19, a voltage sensor for detecting the voltage of the power storage device 19, a temperature sensor for detecting the temperature of the power storage device 19, and the like. The detection data of the sensor built in the power storage device 19 is incorporated into the control device 30 (e.g., controller 30D).

The shovel 200 may have a charging form (hereinafter referred to as a "normal charging mode") charged at a relatively low charging rate (i.e., a relatively small current) and a charging form (hereinafter referred to as a "rapid charging mode") charged at a relatively high charging rate (i.e., a relatively large current) as a charging form (hereinafter referred to as "charging mode") of the power storage device 19. Whether a normal charging mode or a rapid charging mode is adopted as a charging mode when the power storage device 19 is charged depends on the form of power supplied from an external commercial power source (voltage, output, etc.), for example.

A power conversion device may be provided between the power storage device 19 and the DC bus 110 for boosting the output voltage of the power storage device 19 and applying the boosted output voltage to the pump motor 12 and the turning motor 21. In this case, the power conversion device boosts the power of the power storage device 19 or lowers the power of the pump motor 12 and the turning motor 21 via the inverters 18A and 18B to store the power in the power storage device 19. The power conversion device may switch between the step-up operation and the step-down operation so that the voltage value of the DC bus 110 falls within a predetermined range according to the operating states of the pump motor 12 and the turning motor 21. The switching control between the step-up operation and the step-down operation of the power conversion device may be executed by the controller 30B based on, for example, the voltage detection value of the DC bus 110, the voltage detection value of the power storage device 19, and the current detection value of the power storage device 19.

The in-vehicle charger 130 is provided in a power path between the charging port 132 and the power storage device 19. The in-vehicle charger 130 converts AC power supplied from an external commercial power source via a charging cable connected to the charging port 132 into DC power under the control of the controller 30D, adjusts the voltage (current), and supplies the adjusted voltage (current) to the power storage device 19. Thus, the in-vehicle charger 130 can charge the power storage device 19 with power supplied from the external commercial power source.

It should be noted that part or the whole of the in-vehicle charger 130 may be provided on the external commercial power source side, and DC power may be supplied from the external commercial power source. In this case, the in-vehicle charger 130 may be omitted. In addition, two power paths from the charging port 132 and the charging port 132 to the power storage device 19 may be provided as separate systems in the case of charging in the normal charging mode and in the case of charging in the rapid charging mode.

<<Operation System>>

As illustrated in FIG. 2, an operation system of the shovel 200 according to the present embodiment includes a pilot pump 15, an operation device 26, and a pressure control valve 31.

The pilot pump 15 supplies pilot pressure to various hydraulic devices (e.g., pressure control valve 31) mounted on the shovel 200 via the pilot line 25. Thus, the pressure control valve 31 can supply pilot pressure to the control valve 17 according to the operation contents (e.g., operation amount and operation direction) of the operation device 26 under the control of the controller 30A. Therefore, the controller 30A and the pressure control valve 31 can implement the operation of the driven element (hydraulic actuator) according to the operation contents of the operator to the operation device 26. Under the control of the controller 30A, the pressure control valve 31 can supply pilot pressure to the control valve 17 according to the contents of the remote control specified by a remote control signal. The pilot pump 15 is, for example, a fixed displacement hydraulic pump and is driven by a pump motor 12 as described above.

The operation device 26 is provided within reach of the operator in the operator's seat of the cabin 10 and is used by the operator to operate the respective driven elements (i.e., right and left crawlers of the lower traveling body 1, the upper turning body 3, the boom 4, the arm 5, the bucket 6, etc.). In other words, the operation device 26 is used by an operator to operate a hydraulic actuator (e.g., traveling hydraulic motors 1A and 1B, boom cylinder 7, arm cylinder 8, bucket cylinder 9, etc.) or an electric actuator (such as a turning motor 21) for driving each driven element. The operation device 26 is electric, for example, and outputs an electric signal (hereinafter referred to as an "operation signal") according to the operation content by the operator. The operation signal outputted from the operation device 26 is incorporated into the controller 30A. Thus, the control device 30 including the controller 30A can control the pressure control valve 31 and the inverter 18B to control the operation of the driven element (actuator) of the shovel 200 according to the operation contents of the operator and the operation command corresponding to the automatic operation function.

The operation device 26 includes, for example, levers 26A to 26C. The lever 26A may be configured so as to be capable of receiving operations relating to the arm 5 (arm cylinder 8) and the upper turning body 3 (turning operation) in response to operations in the front-back direction and the left-right direction, for example. The lever 26B may be configured so as to be able to receive operations relating to each of the boom 4 (boom cylinder 7) and the bucket 6 (bucket cylinder 9) in response to operations in the front-back direction and the left-right direction, for example. The lever 26C may be configured to receive an operation of the lower traveling body 1 (crawler), for example.

In the case where the control valve 17 is composed of an electromagnetic pilot hydraulic control valve (direction switching valve), the operation signal of the electric operation device 26 may be directly inputted to the control valve 17, and each hydraulic control valve may perform an operation according to the operation content of the operation device 26. The operation device 26 may be a hydraulic pilot system for outputting pilot pressure according to the operation contents. In this case, the pilot pressure corresponding to the operation content is supplied to the control valve 17.

The pressure control valve 31 outputs a predetermined pilot pressure by using hydraulic oil supplied from the pilot pump 15 through the pilot line 25 under the control of the controller 30A. A pilot line on the secondary side of the pressure control valve 31 is connected to the control valve 17, and the pilot pressure outputted from the pressure control valve 31 is supplied to the control valve 17.

<<User Interface System>>

Figure 3:
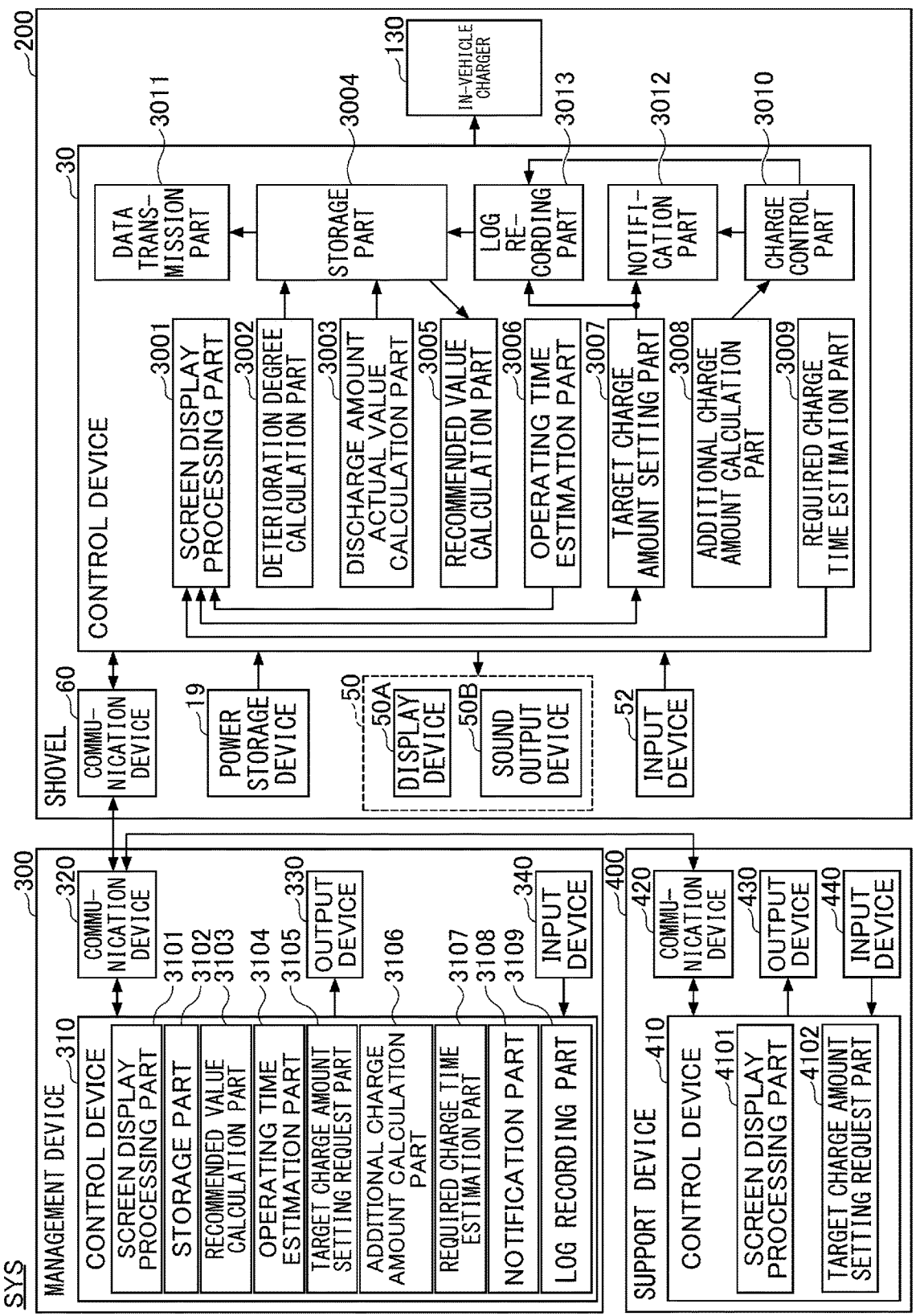
FIG. 3 is a functional block diagram illustrating an example of a functional configuration of a shovel management system.

As illustrated in FIGS. 2 and 3, a user interface system of the shovel 200 according to the present embodiment includes an operation device 26, an output device 50, and an input device 52.

The output device 50 is provided inside the cabin 10 and outputs various kinds of information to a shovel user inside the cabin 10 under the control of the control device 30 (e.g., controller 30A). The output device 50 includes a display device 50A and a sound output device 50B (see FIG. 3).

The display device 50A outputs (notifies) information in a visual manner to a shovel user inside the cabin 10. The display device 50A includes, for example, a liquid crystal display and an organic EL (electroluminescence) display. The display device 50A may be installed, for example, at a location in the cabin 10 that is easily visible from the shovel user seated in the operator's seat, and may display various information images for the shovel user under the control of the controller 30A.

The sound output device 50B outputs information to a shovel user inside the cabin 10 in an auditory manner, for example. The sound output device 50B is, for example, a buzzer or a speaker.

The output device 50 may operate under the control of a controller (e.g., controller 30C) other than the controller 30A. The output device 50 (display device 50A, and sound output device 50B) may be provided in a manner capable of outputting various kinds of information to a user (an operator or a worker) or the like around the shovel 200 outside the cabin 10. For example, the display device 50A and the sound output device 50B may be provided on the side surface of the upper turning body 3, for example, near the portion where the charging port 132 is provided. Thus, the shovel 200 can notify the user of information relating to external charging of the power storage device 19 by using the display device 50A and the sound output device 50B near the charging port 132. In particular, this configuration is preferable when the cabin 10 is omitted as described above.

The input device 52 is provided in the cabin 10 and receives various inputs from a shovel user inside the cabin 10. The input device 52 may include, for example, an operation input device for receiving an operation input from a shovel user. The operation input device includes, for example, a button, a toggle, a lever, a touch panel, a touch pad and the like. The input device 52 may also include, for example, a voice input device for receiving voice input from a shovel user and a gesture input device for receiving gesture input from the shovel user. The voice input device includes, for example, a microphone for acquiring the voice of a shovel user in the cabin 10. The gesture input device includes, for example, an imaging device (indoor camera) capable of imaging the state of a gesture of a shovel user in a cabin 10. A signal corresponding to the input from the shovel user received by the input device 52 is incorporated into the control device 30 (e.g., controller 30A).

The input device 52 may be provided in such a manner as to be able to receive an input from a user (operator or operator) or the like around the shovel 200 outside the cabin 10. For example, the input device 52 may be provided on the side surface of the upper turning body 3, for example, in the vicinity of a portion where the charging port 132 is provided, together with the output device 50 described above. Thus, the shovel 200 can receive an input relating to external charging of the power storage device 19 from the user by using the input device 52 near the charging port 132.

<<Communication System>>

As illustrated in FIGS. 2 and 3, the communication system of the shovel 200 according to the present embodiment includes a communication device 60.

The communication device 60 (an example of an input device) communicates with the outside of the shovel 200 such as the management device 300 through the communication line NW. The communication device 60 includes, for example, a mobile communication module corresponding to a mobile communication standard such as LTE (Long Term Evolution), 4G ($4^{th}$ Generation), or 5G ($5^{th}$ Generation), or a satellite communication module for connecting to a satellite communication network.

<<Control System>>

As illustrated in FIG. 2, the control system of the shovel 200 according to the present embodiment includes a control device 30 and a peripheral information acquisition device 40.

The control device 30 includes controllers 30A to 30D.

The respective functions of the controllers 30A to 30D may be implemented by any hardware or any combination of hardware and software. For example, each of the controllers 30A to 30D may be composed mainly of a computer including a processing part such as a central processing unit (CPU), a memory device (main storage device) such as random access memory (RAM), a nonvolatile auxiliary storage device such as read only memory (ROM), and an external interface device. For example, the controllers 30A to 30D load the programs installed in the auxiliary storage devices into the memory devices and execute the loaded programs on the CPU, thereby implementing various functions. The program data is acquired from a predetermined recording medium by the controllers 30A to 30D through a predetermined external interface, for example, and is installed in the auxiliary storage device. The predetermined recording medium includes, for example, a general-purpose recording medium such as a CD (Compact Disc), a DVD (Digital Versatile Disc), a BD (Blu-ray® Disc), an SD memory card, and a USB (Universal Serial Bus) memory. The predetermined recording medium includes a dedicated recording medium such as a diagnostic tool of the shovel 200. The program data may be downloaded from outside the shovel 200 (e.g., the management device 300, etc.) through the communication device 60 and installed in the auxiliary storage devices of the controllers 30A to 30D.

The controller 30A performs drive control of the shovel 200 in coordination with various controllers constituting the control device 30 including the controllers 30B to 30D.

For example, the controller 30A outputs a control command to the pressure control valve 31 in response to an operation signal input from the operation device 26, and causes the pressure control valve 31 to output a pilot pressure in response to the operation content of the operation device 26. Thus, the controller 30A can implement the operation of the driven element (hydraulic actuator) of the shovel 200 corresponding to the operation content of the electric operation device 26.

When the shovel 200 is remotely operated, the controller 30A may, for example, perform control relating to remote operation. Specifically, the controller 30A may output a control command to the pressure control valve 31, and may output a pilot pressure corresponding to the content of remote control from the pressure control valve 31. Thus, the controller 30A can implement the operation of the shovel 200 (driven element) corresponding to the content of the remote operation.

Further, the controller 30A may, for example, control the automatic operation function. Specifically, the controller 30A may output a control command to the pressure control valve 31 to apply pilot pressure from the pressure control valve 31 to the control valve 17 in response to an operating command corresponding to the automatic operation function. This enables the controller 30A to implement the operation of the driven element (hydraulic actuator) of the shovel 200 corresponding to the automatic operation function.

The controller 30A may integrally control the operation of the entire shovel 200 (various devices installed in the shovel 200) based on bidirectional communications with various controllers such as the controllers 30B to 30D, for example.

The controller 30B performs drive control of the electric drive system based on various information (e.g., a control command or the like including an operation signal of the operation device 26) inputted from the controller 30A.

The controller 30B may, for example, drive the inverter 18B on the basis of the operation contents of the operation device 26 to perform switching control of the operating state (power-running operation and regenerative operation) of the turning motor 21. For example, when the shovel 200 is remotely operated, the controller 30B may drive the inverter 18B based on the contents of the remote operation to control the switching of the operating state (power operation and regeneration operation) of the turning motor 21. When the automatic operation function of the shovel 200 is effective, for example, the controller 30B may drive the inverter 18B based on an operation command corresponding to the automatic operation function to control the switching of the operating state (power operation and regeneration operation) of the turning motor 21.

If the above-described power conversion device is provided between the power storage device 19 and the DC bus 110, the controller 30B may, for example, drive the power conversion device based on the operating state of the operation device 26 to perform the step-up operation and step-down operation of the power conversion device, that is, the switching control between the discharge state and the charge state of the power storage device 19. Further, for example, when the shovel 200 is remotely operated, the controller 30B may drive the power conversion device based on the contents of the remote operation to control the switching between the discharge state and the charge state of the power storage device 19. Further, for example, when the automatic operation function of the shovel 200 is effective, the controller 30B may drive the power conversion device based on an operation command corresponding to the automatic operation function to control switching between the discharge state and the charge state of the power storage device 19.

The controller 30C controls the peripheral monitoring function of the shovel 200.

For example, the controller 30C detects predetermined objects (hereinafter referred to as "monitored targets") and their positions around the shovel 200 on the basis of information (e.g., detection information about objects around the shovel 200 and their positions) about the state of the three-dimensional space around the shovel 200, which is acquired from the peripheral information acquisition device 40.

The controller 30C may also output an alarm through the indoor output device 50 (e.g., a display device, a sound output device, etc.) of the cabin 10, for example, when detecting a monitored object in an area relatively close to the shovel 200.

The controller 30D controls, for example, the power storage device 19.

The controller 30D may, for example, monitor the state of the power storage device 19 or perform abnormality diagnosis based on detection data received from sensors installed in the power storage device 19.

The controller 30D may control, for example, the in-vehicle charger 130 to control charging of the power storage device 19.

Some or all of the functions of the controllers 30B to 30D may be integrated into the controller 30A. That is, the various functions implemented by the control device 30 may be provided by a single controller or may be provided in a distributed manner by two or more appropriately set controllers.

The peripheral information acquisition device 40 is configured to acquire and output information about states of a three-dimensional space of surroundings of the shovel 200. The peripheral information acquisition device 40 may include, for example, an ultrasonic sensor, a millimeter wave radar, a monocular camera, a stereo camera, a depth camera, a LIDAR (Light Detection and Ranging), a range image sensor, an infrared sensor, and the like. The output information of the peripheral information acquisition device 40 is incorporated into the controller 30C.

<<Other Components>>

As illustrated in FIG. 2, the shovel 200 according to the present embodiment includes a DC-DC converter 44, a battery 46, and an air conditioner 80.

The DC-DC converter 44 is provided in the upper turning body 3, for example, and reduces the DC power of a very high voltage outputted from the power storage device 19 to a predetermined voltage (e.g., about 24 volts) and outputs the DC power with the reduced voltage. The output power of the DC-DC converter 44 is supplied to the battery 46 to be charged (stored) or supplied to an electrical device driven by the power of the battery 46, such as controllers 30A to 30C.

The DC-DC converter 44 may be replaced by an alternator. In this case, the alternator is provided on the upper turning body 3 and generates power by the power of the pump motor 12. As in the case of the DC-DC converter 44, the generated power of the alternator is supplied to the battery 46, charged (stored) to the battery 46, or supplied to an electrical device driven by the power of the battery 46, such as the controllers 30A to 30D.

The battery 46 is provided on the upper turning body 3 and has a relatively low output voltage (e.g., 24 volts). The battery 46 supplies power to an electrical device (e.g., controllers 30A to 30D, an air conditioner 80, etc.) other than electrical drive systems that require relatively high power. The battery 46 is, for example, a lead-acid battery or a lithium-ion battery, and is charged by the output power of the DC-DC converter 44 as described above.

The air conditioner 80 adjusts the indoor temperature, humidity, and the like of the cabin 10. The air conditioner 80 operates with power supplied from, for example, the DC-DC converter 44 or the battery 46. The air conditioner 80 is, for example, a heat pump type for both cooling and heating, and includes a compressor 82.

The air conditioner 80 may include, for example, a refrigeration cycle and a heater for heating instead of a heat pump cycle. The heater for heating is, for example, a PTC (Positive Temperature Coefficient) heater or a combustion heater.

The compressor 82 compresses the refrigerant of the heat pump cycle. The compressor 82 includes, for example, a built-in motor, an inverter circuit for driving the motor, and the like, and is electrically driven by power supplied from the power storage device 19. The refrigerant compressed by the compressor 82 is sent to a condenser in a heat pump cycle during cooling operation of the air conditioner 80, and sent to an evaporator in the heat pump cycle during heating operation of the air conditioner 80.

The compressor 82 may be mechanically driven by the pump motor 12.

<Configuration of Management Device>

As illustrated in FIG. 3, the management device 300 includes a control device 310, a communication device 320, an output device 330, and an input device 340.

The control device 310 controls the management device 300. The function of the control device 310 may be implemented by, for example, any hardware or any combination of hardware and software. The control device 310 may be constructed around a computer including, for example, a processor device such as a CPU, a memory device such as a RAM (main storage device), an auxiliary storage device such as a ROM, and an external interface device. For example, the control device 310 loads a program installed in the auxiliary storage device into the memory device and executes the program on the CPU to implement various functions. The data of the program is acquired by the control device 310 from a predetermined recording medium through a predetermined external interface, for example, and is installed in the auxiliary storage device. The predetermined recording medium includes a general-purpose recording medium such as a CD, a DVD, a BD, an SD memory card, a USB memory, or the like. The predetermined recording medium includes a dedicated recording medium such as a diagnostic tool of the management device 300. The program data may be downloaded from a computer outside the management device 300 through the communication device 320 and installed in the auxiliary storage device of the control device 310.

The communication device 320 is any device that communicates with the outside such as the shovel 200 and the support device 400 through the communication line NW.

The output device 330 outputs various kinds of information to the management device user under the control of the control device 310.

The output device 330 includes, for example, a display device configured to output (notify) information to a management device user in a visual manner. The display device includes, for example, a liquid crystal display and an organic EL display. For example, the display device may display various information images for the management device user.

The output device 330 also includes, for example, a sound output device configured to output (notify) information to the management device user in an auditory manner. The sound output device includes, for example, a speaker and a buzzer.

An input device 340 receives various inputs from a management device user. The input device 340 includes, for example, an operation input device configured to receive an operation input from a management device user. The operation input device includes, for example, a mouse, a keyboard, a button, a toggle, a lever, a touch panel, a touch pad and the like. The input device 340 includes, for example, a voice input device configured to receive voice input from a management device user and a gesture input device configured to receive gesture input. The voice input device includes, for example, a microphone configured to acquire voice of the management device user. The gesture input device includes, for example, an imaging device configured to image a state of a gesture of a management device user. A signal corresponding to the input from the management device user received by the input device 340 is incorporated into the control device 310.

<Configuration of Support Device>

As illustrated in FIG. 3, the support device 400 includes a control device 410, a communication device 420, an output device 430, and an input device 440.

The control device 410 controls the support device 400. The function of the control device 410 may be implemented by, for example, any hardware or any combination of hardware and software. The control device 410 may be constructed around a computer including, for example, a processor device such as a CPU, a memory device such as a RAM (main storage device), an auxiliary storage device such as a ROM, and an external interface device. For example, the control device 410 loads a program installed in the auxiliary storage device into the memory device and executes the program on the CPU to implement various functions. The data of the program is acquired by the control device 410 from a predetermined recording medium through a predetermined external interface, for example, and is installed in the auxiliary storage device. The predetermined recording medium includes a general-purpose recording medium such as a CD, a DVD, a BD, an SD memory card, a USB memory, or the like. The predetermined recording medium includes a dedicated recording medium such as a diagnostic tool of the support device 400. The program data may be downloaded from outside the support device 400 (e.g., the management device 300) through the communication device 420 and installed in the auxiliary storage device of the control device 410.

The communication device 420 is any device that communicates with the outside of the support device 400 such as the management device 300 through the communication line NW. The communication device 420 may be, for example, a mobile communication module corresponding to a mobile communication standard such as LTE, 4G, or 5G.

The output device 430 outputs various kinds of information to the support device user under the control of the control device 410.

The output device 430 includes, for example, a display device configured to output (notify) information to a support device user in a visual manner. The display device includes, for example, a liquid crystal display and an organic EL display. The display device may display various information images for a user of the support device, for example.

The output device 430 also includes, for example, a sound output device configured to output (notify) information in an auditory manner to a support device user. The sound output device includes, for example, a speaker and a buzzer.

An input device 440 receives various inputs from a support device user. The input device 440 includes, for example, an operation input device configured to receive an operation input from a support device user. The operation input device includes, for example, a mouse, a keyboard, a button, a toggle, a lever, a touch panel, a touch pad and the like. The input device 440 includes a voice input device configured to receive voice input from a support device user and a gesture input device configured to receive gesture input. The voice input device includes, for example, a microphone configured to acquire voice of the support device user. The gesture input device includes, for example, an imaging device configured to be capable of imaging the state of a gesture of a support device user. The signal corresponding to the input from the support device user received by the input device 440 is incorporated into the control device 410.

[Target Charge Amount Setting Function]

Next, a target charge amount setting function for the power storage device 19 will be described with reference to FIGS. 4 to 6 in addition to FIG. 3.

The target charge amount setting function for the power storage device 19 is a function that enables a user to perform a predetermined input through the input device 52, 340, or 440, to indicate a target value of the charge amount (target charge amount) at the time of charging the power storage device 19 and to cause the control device 30 to set the indicated target charge amount. When the target charge amount is set to the power storage device 19 through the target charge amount setting function, the power storage device 19 to which the target charge amount has been set is charged up to the target charge amount set, thereby charging is completed. The target charge amount of the power storage device 19, which is set through the target charge amount setting function, may be effective only once immediately following charge of the power storage device 19, or may continue to be effective as long as the target charge amount is not cancelled in response to a predetermined input through the input device 52, 340, or 440. Further, the period or the number of times the target charge amount set to the power storage device 19 is effective may be set through the input device 52, 340, or 440. Hereinafter, the charge amount represents the absolute amount of electric power charged (stored) in the power storage device 19.

<Configuration of Target Charging Amount Setting Function of Shovel>

As illustrated in FIG. 3, the control device 30 includes a screen display processing part 3001, a deterioration degree calculation part 3002, a discharge amount actual value calculation part 3003, a storage part 3004, a recommended value calculation part 3005, an operating time estimation part 3006, a target charge amount setting part 3007, an additional charge amount calculation part 3008, a required charge time estimation part 3009, a charge control device 3010, a data transmission part 3011, a notification part 3012, and a log recording part 3013.

The screen display processing part 3001 causes the display device 50A to display various screens relating to the target charge amount setting function.

The screen display processing part 3001 causes the display device 50A to display, for example, a setting screen relating to a target value of the charge amount of the power storage device 19. The setting screen for the target charge amount of the power storage device 19 is a screen for the shovel user to give an indication relating to the target charge amount of the power storage device 19 to the control device 30 to set the target charge amount. The screen display processing part 3001 may shift the display content of the display device 50A to the setting screen relating to the target charge amount when a predetermined input for displaying the setting screen relating to the target charge amount input from the shovel user via the input device 52 is received.

Figure 4:
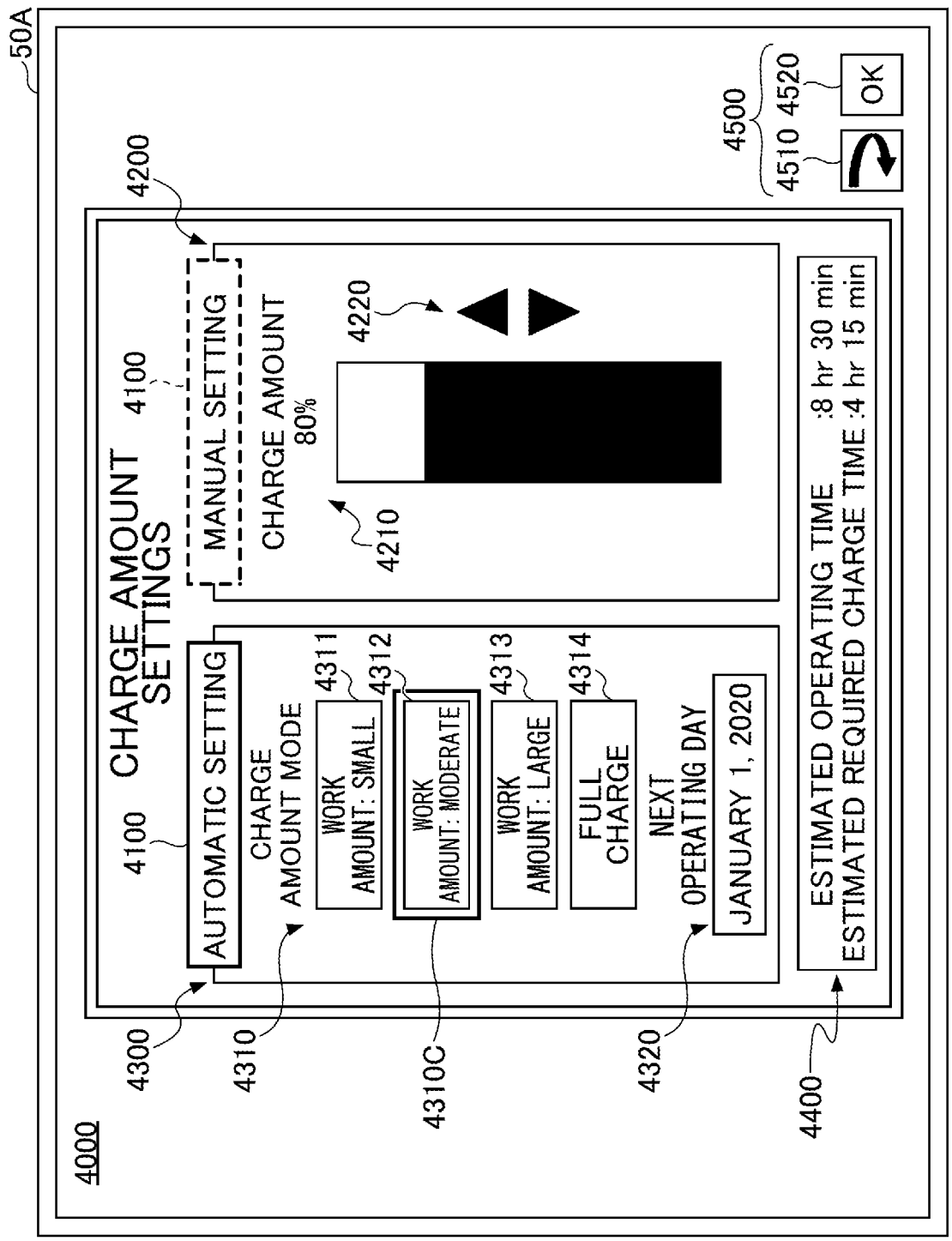
FIG. 4 is a diagram illustrating an example of a setting screen relating to a target charge amount of a power storage device.

For example, FIG. 4 is a diagram illustrating an example of a setting screen (setting screen 4000) relating to the target charge amount of the power storage device 19 displayed on the display device 50A.

The setting screen 4000 includes a cursor 4100, a setting operation area 4200, a setting operation area 4300, an information presentation area 4400, and a display content change area 4500.

The cursor 4100 indicates which of the manual setting mode and the automatic setting mode is effective (selected state) for setting the target charge amount of the power storage device 19. The manual setting mode represents a state in which the target charge amount is set using the setting operation area 4200, and the automatic setting mode represents a state in which the target charge amount is set using the setting operation area 4300. In this example, the cursor 4100 indicates the setting operation area 4300 (specifically, text information of "Automatic setting"), and indicates that the target charge amount is set using the setting operation area 4300 (automatic setting mode).

The cursor 4100 is configured so as to be capable of switching between a state for indicating the setting operation area 4200 (specifically, the character information of "Manual setting") and a state for indicating the setting operation area 4300 in response to a predetermined input to the input device 52. Thus, the shovel user can operate the cursor 4100 through the input device 52 to switch between a state in which the target charge amount is set using the setting operation area 4200 (manual setting mode) and a state in which the target charge amount is set using the setting operation area 4300 (automatic setting mode).

The setting operation area 4200 is used so that the shovel user indicates a specific value through the input device 52 to cause the control device 30 to set the specific value (hereinafter referred to as an "indication value") as the target charge amount. This enables the shovel user to manually input the indication value through the input device 52 to manually set the target charge amount of the power storage device 19 in the control device 30. When the setting operation area 4200 is indicated (selected) by the cursor 4100, the operation through the input device 52 becomes effective.

The setting operation area 4200 includes a target charge amount display part 4210 and a charge amount indication operation part 4220.

The target charge amount display part 4210 displays a target charge amount (indication value). In this example, the target charge amount (indication value) is illustrated in the target charge amount display part 4210 as a bar graph extending in the vertical direction. In addition, the target charge amount (indication value) illustrated in the bar graph is indicated in the target charge amount display part 4210 as character information. In this example, character information indicating that the charge amount is 80% is illustrated.

The charge amount indication operation part 4220 is configured to be operated by a shovel user through an input device 52. Thus, the shovel user can operate the charge amount indication operation part 4220 through the input device 52 to specify the target charge amount (indication value) to a desired value. In this example, the charge amount indication operation part 4220 includes icons of isosceles triangles pointing upward and downward. Thus, for example, when the setting screen 4000 starts to be displayed, the target charge amount (indication value) is set to a predetermined initial value, and the shovel user can increase the target charge amount (indication value) from the initial value by operating an upward isosceles triangle icon through the input device 52. Further, the shovel user can operate a downward isosceles triangle icon through the input device 52 to decrease the target charge amount (indication value) from the initial value.

When the target charge amount (indication value) is changed in response to the operation of the charge amount indication operation part 4220, the display content of the target charge amount display part 4210 is changed in synchronization with the target charge amount (indication value).

In the setting operation area 4200, instead of or in addition to the charge amount indication operation part 4220, an indication operation part may be provided that enables a user to directly input an indication value as a numerical value through the input device 52.

The setting operation area 4300 is used for the shovel user to select one of a plurality of options representing a plurality of recommended values for the target charge amount through the input device 52, and to cause the control device 30 to automatically set a recommended value corresponding to the selected one of the plurality of options as the target charge amount. When the setting operation area 4300 is indicated (selected) by the cursor 4100, the operation through the input device 52 becomes effective.

The setting operation area 4300 includes an optional icon group 4310 and a next operating day indication part 4320.

The optional icon group 4310 includes optional icons 4311 to 4314 representing recommended values for a plurality (in this example, four) of target charge amounts.

The optional icon 4311 represents a recommended value of a relatively small target charge amount. In this example, a recommended value corresponding to a case where the work amount of the work to be performed by the shovel 200 on the work day is relatively small is illustrated.

The optional icon 4312 represents a recommended value of a relatively moderate target charge amount. In this example, a recommended value corresponding to a case where the work amount of the work to be performed by the shovel 200 on the work day is relatively moderate is illustrated.

The optional icon 4313 represents a recommended value of a relatively large target charge amount. In this example, a recommended value corresponding to a case where the work amount of the work to be performed by the shovel 200 on the work day is relatively large is illustrated.

The optional icon 4314 represents a recommended value for the target charge amount corresponding to the full charge (charge amount "100%") of the power storage device 19.

The shovel user can select any one of the optional icons 4311 to 4314 through the input device 52. A cursor 4310C is superimposed and displayed on the selected optional icon 4311 to 4314. This enables the shovel user to visually recognize the currently selected optional icon.

In the setting operation area, instead of displaying a plurality of optional icons, only one icon representing a recommended value of a single target charge amount may be displayed.

The next operating day indication part 4320 is used for a user to indicate the next operating day (scheduled work day) of the shovel 200 to the control device 30 through the input device 52. The next operating day indication part 4320 displays the next operating day of the shovel 200 inputted through the input device 52. Thus, as described later, the control device 30 can calculate a recommended value corresponding to each of the optional icons 4311 to 4313 in consideration of information relating to the next operating day (e.g., weather forecasts and seasons) and the like. In this example, the next operating day indication part 4320 indicates that the next operating day of the shovel 200 is Jan. 1, 2020.

In the information presentation area 4400, information relating to a currently indicated target charge amount (indication value or recommended value corresponding to the selected optional icon) is presented.

The information presentation area 4400 displays, for example, an estimated operating time. The estimated operating time represents an estimated value of the operating time of the shovel 200 when the power storage device 19 is charged up to the currently indicated target charge amount (indication value or recommended value). Thus, the shovel user can identify the operating time of the shovel 200 to some extent when the power storage device 19 is charged up to the currently indicated target charge amount. Therefore, for example, the shovel user can adjust the target charge amount (indication value) or change the optional icon to be selected from the optional icons 4311 to 4314 while checking the display contents of the information presentation area 4400 in order to obtain the required operating time.

In the information presentation area 4400, for example, an estimated time required for charging is displayed as an estimated required charge time. The estimated required charge time represents an estimated value for the time required to charge the power storage device 19 up to the currently indicated target charge amount (indication value or recommended value). Thus, the shovel user can identify the approximate required time for charging the power storage device 19 up to the currently indicated target charge amount. Therefore, the shovel user can, for example, compare the remaining time up to the start of the next work with the estimated required charge time, and adjust the target charge amount (indication value) or change the optional icon selected from the optional icons 4311 to 4314. The estimated required charge time of the information presentation area 4400 may be an estimated required charge time set in advance for any one of the cases in which charging is performed in the normal charging mode and charging is performed in the rapid charging mode. In the information presentation area 4400, the estimated required charge time for both the cases of charging being performed in the normal charging mode and of charging being performed in the rapid charging mode may be presented.

In the automatic setting mode, the information presentation area 4400 may display not only the currently indicated option but also an estimated operating time and an estimated required charge time corresponding to other options. In the information presentation area 4400, either one of the estimated operating time and the estimated required charge time may be presented. Further, other information (e.g., the currently set charging mode, etc.) may be presented in the information presentation area 4400 in place of or in addition to the estimated operating time and the estimated required charge time.

The display content change area 4500 is used for the shovel user to change the display content of the display device 50A from the setting screen 4000 relating to the target charge amount to a screen of other contents through the input device 52. The display content change area 4500 includes a home screen transition icon 4510 and a target charge amount determination icon 4520.

The home screen transition icon 4510 is used for the shovel user to shift the display contents of the display device 50A to a predetermined home screen by discarding the contents relating to the target charge amount indicated on the setting screen 4000 relating to the target charge amount through the input device 52. Thus, the shovel user can operate the home screen transition icon 4510 through the input device 52, discard the contents indicated on the setting screen 4000 relating to the current target charge amount, and cause the control device 30 to shift the display contents of the display device 50A to the home screen.

The target charge amount determination icon 4520 is used for the shovel user to determine the contents relating to the target charge amount indicated on the setting screen 4000 relating to the target charge amount through the input device 52, and to shift the display contents of the display device 50A to the home screen. Thus, the shovel user can operate the target charge amount determination icon 4520 through the input device 52 to cause the control device 30 to set the target charge amount at a recommended value corresponding to the indication value or the optional icon indicated by the current setting screen 4000.

The screen display processing part 3001 causes the display device 50A to display, for example, a confirmation screen relating to the progress of deterioration of the power storage device 19.

With the target charge amount setting function, the shovel user enables the control device 30 to set the target charge amount such that the charge amount is lower than the full charge state when charging is completed. Thus, the target charge amount setting function limits the charge amount of the power storage device 19 to be smaller than the full charge state when charging is completed, thereby inhibiting deterioration of the power storage device 19. Accordingly, the shovel user can confirm the progress of the deterioration degree of the power storage device 19 with the target charge amount setting function, such as an inhibition progress of the deterioration degree of the power storage device 19 through the confirmation screen. The screen display processing part 3001 may shift the display content of the display device 50A to the confirmation screen relating to the progress of the deterioration of the power storage device 19, upon receiving a predetermined input for displaying the confirmation screen relating to the progress of the deterioration of the power storage device 19, which is input from the shovel user through the input device 52.

Figure 5:
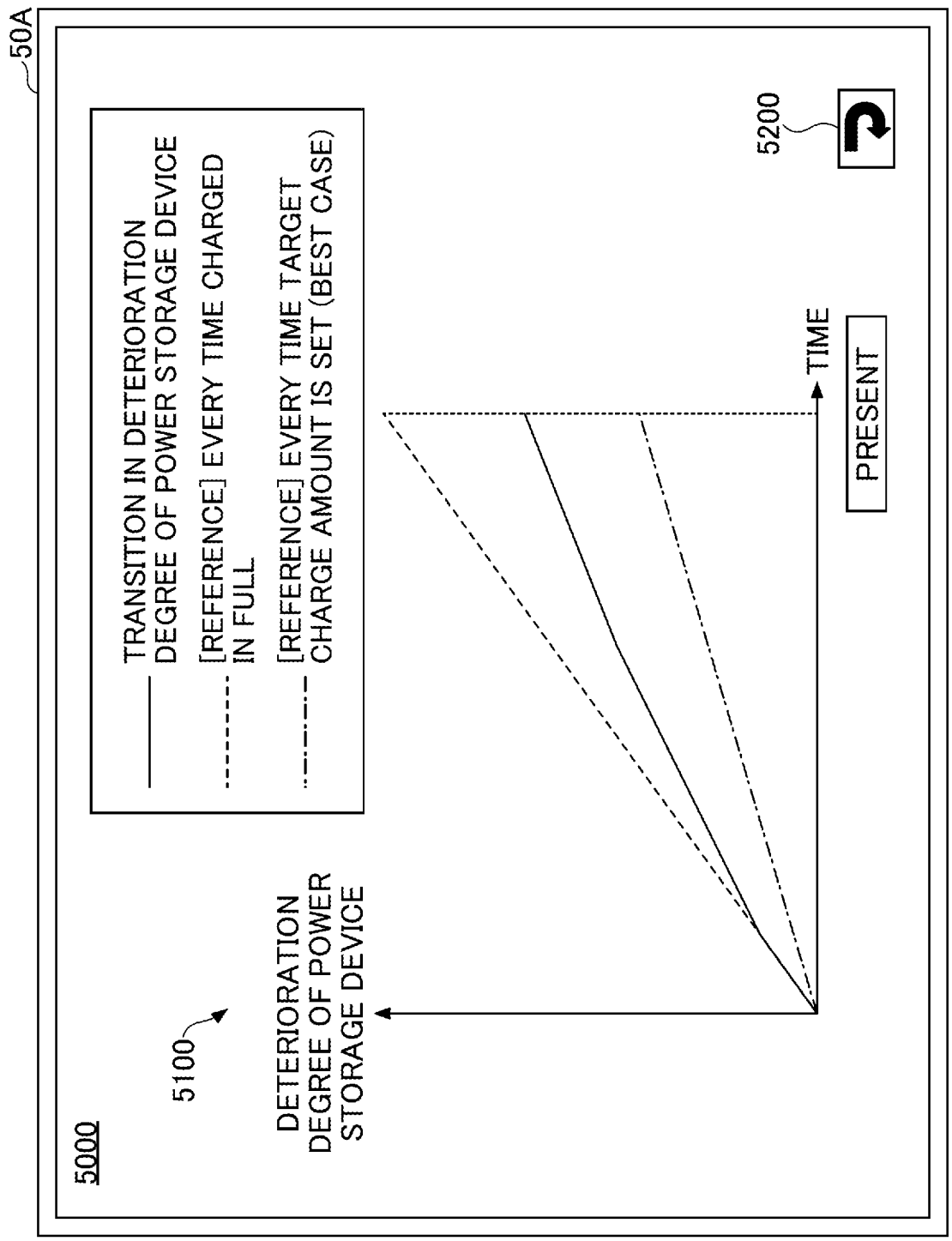
FIG. 5 is a diagram illustrating an example of a confirmation screen relating to a progress of deterioration of the power storage device.

For example, FIG. 5 is a diagram illustrating an example of a confirmation screen (confirmation screen 5000) relating to the progress of deterioration of the power storage device 19.

As illustrated in FIG. 5, the confirmation screen 5000 includes a display area 5100 and a home screen transition icon 5200.

The display area 5100 displays image information illustrating a progress of deterioration of the power storage device 19 including effects of the target charge amount setting function. Specifically, the display area 5100 displays a graph (solid line) illustrating a transition in a deterioration degree of the power storage device 19 up to the present. The display area 5100 also displays, as comparisons, graphs (dotted line and dashed line) respectively illustrating a transition in the deterioration degree of the power storage device 19 on the assumption that the power storage device is charged up to the full charge every time the power storage device is charged, and a transition in the deterioration degree of the power storage device 19 on the assumption that a target charge amount lower than the full charge is set by the target charge amount setting function every time the power storage device is charged. In particular, the graph illustrating the deterioration degree of the power storage device 19 on the assumption that the target charge amount lower than the full charge amount is set by the target charge amount setting function every time the power storage device is charged corresponds to the best case in which the charging is completed within a range of the charge amount in which the progress of the deterioration of the power storage device 19 is most inhibited. That is, the display area 5100 displays a transition in the actual deterioration degree of the power storage device 19, and predicted transitions in the deterioration degree of the power storage device 19 on the assumption that charging is completed with a charge amount (full charge) in which deterioration is relatively easy to progress and on the assumption that charging is completed with a charge amount in which deterioration is relatively difficult to progress (target charge amount lower than full charge). This enables a user to confirm the transition in the deterioration degree of the power storage device 19 through the display area 5100. Further, a user can confirm whether a transition in the deterioration degree of the power storage device 19 is relatively progressed or inhibited, based on comparisons with the respective predicted transitions in the deterioration degree of the power storage device 19 on the assumption that the charging is completed with the charge amount in which the deterioration is relatively easy to progress, and on the assumption that the charging is completed with the charge amount in which the deterioration is difficult to progress.

When the power storage device is charged in full every time the power storage device is charged, the deterioration of the power storage device 19 progresses relatively quickly. Therefore, the deterioration degree of the power storage device 19, which is on the assumption that the power storage device is charged in full every time the power storage device is charged, progresses with a relatively large gradient and becomes relatively large.

When every charging of the power storage device is completed with a charge amount lower than the full charge, the deterioration of the power storage device 19 progresses relatively slowly. Therefore, the deterioration degree of the power storage device 19 in the best case, which is on the assumption that the target charge amount is set by the target charge amount setting function every time the power storage device 19 is charged, progresses with a relatively small gradient and becomes relatively small.

In this example, although, immediately after the shovel 200 was shipped from the factory and the charge was started, the power storage device 19 was being charged in full every time the power storage device was charged, the target charge amount setting function started to be used, and the target charge amount to be set became, most recently, set in the range in which deterioration is most inhibited. Therefore, it appears that the deterioration degree of the power storage device 19 is gradually decreased and inhibited to some extent compared to the case, which is on the assumption that the power storage device is charged in full every time the power storage device is charged. Therefore, by checking the graphs in the display area 5100, the shovel user can identify the state in which the deterioration of the power storage device 19 is reduced by the use of the target charge amount setting function.

The home screen transition icon 5200 has the same function as the home screen transition icon 4510 in FIG. 4, and hence, a description thereof is omitted.

The screen display processing part 3001 causes the display device 50A to display, for example, a confirmation screen relating to a charging result and a charging status of the power storage device 19. When a predetermined input from the shovel user is received through the input device 52, the screen display processing part 3001 may shift the display content of the display device 50A to a confirmation screen relating to the charging result and charging status of the power storage device 19.

For example, FIG. 6 is a diagram illustrating an example of a confirmation screen (confirmation screen 6000) relating to charging results and charging statuses of the power storage device 19. This indicates the confirmation screen 6000 presenting logs relating to charging based on the target charge amount setting function of the power storage device 19.

The confirmation screen 6000 includes a display area 6100 and a home screen transition icon 6200.

The display area 6100 displays a log relating to each charge of the power storage device 19 in which the target charge amount is set and the power storage device is charged by the target charge amount setting function of the power storage device 19 in a table format.

The log displays a "date", a "charging time period", a "charging mode", a "setting mode", a "target charge amount", a "previous discharge amount", a "deterioration degree", and the like for each charge in which the target charge amount is set and the battery is charged by the target charge amount setting function of the power storage device 19.

The "date" represents the date on which charging is performed by setting the target charge amount by the target charge amount setting function of the power storage device 19.

The "charging time period" indicates a time period in which charging is performed by setting the target charge amount by the target charge amount setting function of the power storage device 19. Specifically, the "charging time period" item displays the charging start time and the charging end time. For logs relating to charging that has been already completed, both the start time and the end time are displayed. Meanwhile, for a log relating to current charging, only the start time is displayed, and character information "charging in progress" is displayed corresponding to the end time.

Note that a log relating to charging before the start of charging may be displayed on the confirmation screen 6000. In this case, character information indicating that charging has not started may be displayed in the field of "charging time period".

The "charging mode" indicates a charging mode in which the target charge amount is set by the target charge amount setting function of the power storage device 19, that is, a normal charging mode or a rapid charging mode.

The "charging mode" indicates a charging mode in which the target charge amount is set by the target charge amount setting function of the power storage device 19, that is, a normal charging mode or a rapid charging mode.

The "setting mode" indicates a setting mode when the target charge amount is set by the target charge amount setting function of the power storage device 19, that is, a manual setting mode or an automatic setting mode.

The "target charge amount" represents a set value of the target charge amount set by the target charge amount setting function of the power storage device 19.

The "previous discharge amount" represents an actual value of the discharge amount of the power storage device 19 from the time of the previous charging of the power storage device 19 to the time when the target charge amount is set by the target charge amount setting function of the power storage device 19 and charging is started.

The "deterioration degree" represents a deterioration degree of the power storage device 19 at the time when the target charge amount is set by the target charge amount setting function of the power storage device 19 and charging is started.

The home screen transition icon 6200 has the same function as the home screen transition icon 4510 in FIG. 4, and a description thereof is omitted.

By checking the confirmation screen 6000, a shovel user can identify the previous results of charging of the power storage device 19 after the target charge amount is set by the target charge amount setting function. Further, by checking the confirmation screen 6000, a shovel user can identify information relating to charging in progress or scheduled charging after the target charge amount is set by the target charge amount setting function. Therefore, the control device 30 can improve the convenience of the shovel user.

Returning to FIG. 3, the deterioration degree calculation part 3002 calculates a deterioration degree of the power storage device 19 based on detection data such as voltage and current of the power storage device 19 captured from the power storage device 19. The deterioration degree calculation part 3002 calculates (estimates) a deterioration degree of the power storage device 19 at a predetermined timing, for example, at the time of initial processing of the control device 30 in the starting process of the shovel 200 or at the time of termination processing in the stopping process of the shovel 200. The data relating to the deterioration degree (hereinafter, "deterioration degree calculation data") calculated by the deterioration degree calculation part 3002 is stored in the storage part 3004.

The discharge amount actual value calculation part 3003 calculates the actual value of the discharge amount of the power storage device 19 within a predetermined period, based on detection data such as voltage and current of the power storage device 19 acquired from the power storage device 19. The discharge amount actual value calculation part 3003 may calculate, for example, an actual value of the discharge amount of the power storage device 19 from the start (e.g., turning on the key switch) to the stop (e.g., turning off the key switch) of the shovel 200. The discharge amount actual value calculation part 3003 may calculate, for example, an actual value of the discharge amount of the power storage device 19 for each day. Data relating to the actual value of the discharge amount of the power storage device 19 calculated by the discharge amount actual value calculation part 3003 (hereinafter, "discharge amount actual value data") is stored in the storage part 3004.

The storage part 3004 stores data relating to the target charge amount of the power storage device 19. The storage part 3004 stores, for example, deterioration degree calculation data calculated by the deterioration degree calculation part 3002 and discharge amount actual value data calculated by the discharge amount actual value calculation part 3003. The storage part 3004 stores various data to be used by a recommendation value calculation part 3005 to calculate a recommendation value.

The recommended value calculation part 3005 calculates a recommended value of a target charge amount in the automatic setting mode.

The recommended value calculation part 3005 may calculate only a single recommended value for the target charge amount based on, for example, information on the previous operation results of the shovel 200 or information on the next work content (arrangement) of the shovel 200. In this case, the information on the next work arrangement may be input from a shovel user through the input device 52, or may be input (received) from the management device 300 or the like through the communication device 60.

Further, when a plurality of options relating to the target charge amount are prepared, as in the case of the setting screen 4000 in FIG. 4, for example, the recommended value calculation part 3005 calculates a recommended value for the target charge amount for each of the plurality of options.

The recommended value for the target charge amount may be calculated, for example, based on the discharge amount actual value data of the power storage device 19. The recommended value calculation part 3005 statistically analyzes the discharge amount (i.e., the work amount of the shovel 200) of the power storage device 19 in a predetermined charge cycle (e.g., every day), for example, based on the history of the discharge amount actual value data. The recommended value calculation part 3005 may calculate a single recommended value for the target charge amount in consideration of the (discharge amount) work amount or the like in the latest predetermined period (e.g., several days, etc.). Further, the recommended value calculation part 3005 may calculate a single recommended value for the target charge amount corresponding to the required work amount based on the information on the arrangement of the next work of the shovel 200. When a plurality of options relating to the target charge amount are prepared, the recommended value calculation part 3005 may calculate a recommended value for each of the cases where the work amount of the shovel 200 per charge cycle is relatively large, average, and relatively small, based on the analysis results of the work amount of the shovel 200 for each predetermined charging cycle.

The recommended value for the target charge amount may be calculated based on, for example, data relating to the date and time when the next work by the shovel 200 is performed. The data relating to the date and time when the next work is performed by the shovel 200 includes, for example, data corresponding to the content of the next operating day indication part 4320 of the setting screen 4000 in FIG. 4. The recommended value calculation part 3005 recognizes, for example, the season of the date and time and the predicted weather (e.g., weather, cloudiness, rain, snow, temperature, humidity, etc.) based on the data relating to the date and time when the next work is to be performed, and predicts the operating state of the air conditioner 80 on that date and time. Then, the recommended value calculation part 3005 may correct a predetermined default recommended value or a plurality of recommended values (e.g., a relatively high recommendation, an intermediate recommendation, and a relatively low recommendation) in consideration of the current consumption based on the predicted operating state of the air conditioner 80.

Further, the recommended value for the target charge amount may be calculated based on, for example, data relating to environmental conditions of the work site of the shovel 200. The environmental conditions of the work site of the shovel 200 may include, for example, degrees of undulating ground at the work site and the work contents at the work site. The data relating to the environmental conditions of the work site of the shovel 200 may be acquired, for example, by the peripheral information acquisition device 40. Data relating to the environmental conditions of the work site of the shovel 200 may be distributed to the shovel 200 from an external device such as the management device 300. The recommended value calculation part 3005 determines, for example, whether the energy consumption at the next work site of the shovel 200 is relatively high or low based on the data relating to the environmental conditions of the work site of the shovel 200, and determines a level of the energy consumption relative to a predetermined reference. Then, the recommended value calculation part 3005 may correct a single default recommended value or a plurality of recommended values prepared in advance in consideration of the level of the energy consumption relative to the predetermined reference.

The recommended value for the target charge amount may be calculated based on, for example, data relating to a position of the shovel 200. Data relating to positional information of the shovel 200 is acquired, for example, by a positioning device (e.g., the Global Navigation Satellite System (GNSS) module) installed in the shovel 200. For example, data relating to the position of the shovel 200 with respect to the base station may be acquired based on the exchange of signals between the communication device 60 and the nearest base station. The recommended value calculation part 3005 may, for example, recognize a location of the work site based on the data relating to the position of the shovel 200 and determine the environmental conditions (season, temperature, humidity, altitude, mountainous area or urban area, etc.) of the location. The recommended value calculation part 3005 may correct a single predetermined default recommended value or a plurality of recommended values in consideration of the level of the energy consumption relative to a predetermined reference, as in the case of using data relating to the environmental conditions of the shovel 200.

The recommended value for the target charge amount for each of the plurality of options may be calculated based on, for example, data relating to a deteriorated state of the power storage device 19 (e.g., deterioration degree data). The recommended value calculation part 3005 may, for example, correct a single default recommended value or a plurality of recommended values prepared in advance in consideration of the deterioration degree of the power storage device 19.

The recommended value for the target charge amount may be calculated based on, for example, two or more types of data from among the plurality of types of data. The recommended value calculation part 3005 may, for example, correct a predetermined default recommended value or a plurality of recommended values based on the two or more types of data. Further, the recommended value calculation part 3005 may, for example, use other types of data to correct the recommended values for the relatively large, average, and relatively small work amount of the shovel 200 per charge cycle calculated based on the actual discharge amount data of the power storage device 19.

The recommended value for the target charge amount may be calculated, for example, based on at least one of an upper limit value or a lower limit value of the charge amount of the power storage device 19 defined in consideration of deterioration of the power storage device 19. The recommended value for the target charge amount is set to be equal to or less than the upper limit value, for example. The recommended value for the target charge amount is calculated so as not to fall below the lower limit value at the end of the next work of the shovel 200, for example. This is because, if the charge amount of the power storage device 19 is maintained at a near full charge state or at a very low state, deterioration may easily progress. The upper limit value is set to a value smaller than a value corresponding to a full charge (e.g., 100%), such as 80%. The lower limit value is set to a value larger than a value corresponding to complete discharge (e.g., 0%), such as 40%.

The operating time estimation part 3006 estimates an operating time of the shovel 200 when the power storage device 19 is charged up to a set target charge amount, and acquires (calculates) the estimated operating time. For example, in the case of the manual setting mode, the operating time estimation part 3006 may calculate an estimated operating time for charging the power storage device 19 up to the content (indication value) indicated to the target charge amount display part 4110 of the setting screen 4000. For example, in the automatic setting mode, the operating time estimation part 3006 may calculate an estimated operating time for charging the power storage device 19 up to a recommended value corresponding to a selected optional icon in the optional icon group 4310 of the setting screen 4000. As a result, the screen display processing part 3001 can display the estimated operating time on a setting screen relating to the target charge amount of the power storage device 19 and notify a shovel user thereof (see, for example, the information presentation area 4400 of FIG. 4).

The target charge amount setting part 3007 sets a target charge amount of the power storage device 19, in response to a predetermined input received by the input device 52. For example, when the target charge amount determination icon 4520 is operated through the input device 52 on the setting screen 4000, the target charge amount setting part 3007 may set an indicated content (indication value or recommended value) on the setting screen 4000 to the target charge amount of the power storage device 19. Thus, the control device 30 can set the target charge amount of the power storage device 19, in response to a predetermined input of the shovel user through the input device 52.

As will be described later, the target charge amount setting part 3007 may set a target charge amount of the power storage device 19, based on the setting contents relating to the target charge amount included in the request signals that are received from the management device 300 and the support device 400 through the communication device 60. This enables the target charge amount setting part 3007 to reflect the target charge amount set by the management device 300 and the support device 400 as the setting contents relating to the target charge amount of the shovel 200, as will be described later.

The additional charge amount calculation part 3008 calculates a current charge amount of the power storage device 19 based on the detection data received from the power storage device 19, and calculates a charge amount ("additional charge" below.) to be added to the set target charge amount when charging is started from the current state of the power storage device 19.

The required charge time estimation part 3009 estimates a required time for charging the power storage device 19 up to a set target charge amount, and calculates an estimated required charge time. For example, in the case of the manual setting mode, the required charge time estimation part 3009 may calculate an estimated required charge time for charging the power storage device 19 up to the content (indication value) indicated on the target charge amount display part 4110 of the setting screen 4000. For example, in the automatic setting mode, the required charge time estimation part 3009 may calculate an estimated required charge time for charging the power storage device 19 to a recommended value corresponding to the selected optional icon in the optional icon group 4310 of the setting screen 4000. In the automatic setting mode, the required charge time estimation part 3009 may calculate the estimated required charge time required for charging the power storage device 19 up to a recommended value corresponding to each of all the optional icons 4311 to 4314, which include the selected optional icon in the optional icon group 4310 of the setting screen 4000. As a result, the screen display processing part 3001 can display the estimated required charge time on the target charge amount setting screen to notify a shovel user (see, for example, the information presentation area 4400 of FIG. 4). Further, the required charge time estimation part 3009 may calculate an estimated required charge time for at least one of a case of charging in the normal charging mode or a case of charging in the rapid charging mode. This enables the screen display processing part 3001 to display, on the target charge amount setting screen, a notification to a shovel user of the estimated required charge time to distinguish between the cases where the power storage device 19 is charged in the normal charging mode and where the power storage device 19 is charged in the rapid charging mode.

The charge control device 3010 controls the charging of the power storage device 19 by the power from the external commercial power source through the in-vehicle charger 130, for example, while a charging cable is connected to the charging port 132. The charge control device 3010 controls the in-vehicle charger 130 so as to charge the power storage device 19 to the charge amount of the power storage device 19, which meets the target charge amount set by the target charge amount setting part 3007, for example.

The data transmission part 3011 transmits data relating to the target charge amount of the power storage device 19, such as deterioration degree data and discharge amount actual value data acquired by the shovel 200 and stored in the storage part 3004, to the management device 300 through the communication device 60. As a result, the management device 300 can acquire data relating to the target charge amount of the power storage device 19. For example, every time the contents of the storage part 3004 are updated, the data transmission part 3011 may transmit the updated data (newly added data) to the management device 300. The data transmission part 3011 may also transmit updated data from the previous data transmission to the management device 300 when the shovel 200 is started or stopped.

The notification part 3012 transmits a notification signal indicating a notification relating to the charging of the power storage device 19 to the management device 300 through the communication device 60.

For example, when the setting of the target charge amount of the power storage device 19 is completed based on the request signal from the management device 300, the notification part 3012 transmits a notification signal indicating that the setting of the target charge amount based on the request signal is completed to the management device 300 through the communication device 60. Thus, the management device 300 can recognize that the setting of the target charge amount is reflected with respect to the request signal on the shovel 200 side.

For example, when charging of the power storage device 19 based on the target charge amount set by the target charge amount setting function is completed, the notification part 3012 transmits a notification signal indicating that charging of the power storage device 19 is completed to the management device 300. Thus, the management device 300 can recognize that the charging up to the target charge amount of the power storage device 19 has been completed.

The log recording part 3013 records a log relating to charging based on the target charge amount setting function of the power storage device 19 in the storage part 3004. Specifically, the log recording part 3013 records in the storage part 3004 various kinds of information generated in the process until the target charge amount is set by the target charge amount setting function of the power storage device 19 and the charging of the power storage device 19 is completed. In each case where the target charge amount is set by the target charge amount setting function of the power storage device 19 to charge the power storage device 19, a record corresponding to a log is created and the created record is stored in a storage part 3004. The record stores, for example, "date", "charging time period", "charging mode", "setting mode", "target charge amount", "previous discharge amount", and "deterioration degree" displayed in the display area 6100 of the confirmation screen 6000. As a result, a record group of logs relating to charging based on the target charge amount setting function of the power storage device 19, which is a database, is constructed in the storage part 3004. Therefore, the screen display processing part 3001 can display the confirmation screen 6000 on the display device 50A by referring to the database of the logs relating to charging based on the target charge amount setting function of the power storage device 19 stored in the storage part 3004.

As described above, according to the present embodiment, the shovel 200 (control device 30) sets a target value of the charge amount (target charge amount) of the power storage device 19 according to the power supplied from the external power source in response to a predetermined input received by the input device 52.

This enables the shovel 200 to limit the charge amount of the power storage device 19 after being charged with the power from the external power source to the target charge amount indicated by the shovel user, in response to the input from the shovel user. Thus, the shovel user, for example, enables the shovel 200 to set the target charge amount according to the contents of the next work to avoid a situation in which extra power is left over at the end of the work or the charge amount of the power storage device 19 does not last until the end of the work. Therefore, the shovel 200 can more appropriately charge the power storage device 19 capable of being charged with power from the external power source.

In the present embodiment, the input device 52 may directly receive an input from a user inside the cabin 10 or a user around the shovel 200.

This enables the control device 30 to set the target charge amount of the power storage device 19, in response to a direct input to the shovel 200.

In the present embodiment, the communication device 60 may be configured to receive a request signal, which corresponds to an input from a user, from a predetermined external device (e.g., the management device 300 and the support device 400).

This enables the control device 30 to set the target charge amount of the power storage device 19, in response to an indirect input from the external device.

In the present embodiment, the control device 30 may set a specific value (indication value) as the target charge amount, in response to a predetermined input for specifying the specific value.

This enables a shovel user to specifically set the specific value as the target charge amount to the shovel 200 in the form of indicating the shovel 200 with respect to setting the specific value as the target charge amount.

In the present embodiment, the display device 50A may display the setting screen 4000, which is operable by a user, according to an input from the input device 52. The setting screen 4000 may display a bar-shaped image (bar graph of the target charge amount display part 4210) that is fixed at one end and can be changed at the other end a position of which corresponds to a specific value by operation from the input device 52.

This enables the shovel user to specifically indicate a specific value as the target charge amount by operating the bar graph on the setting screen 4000, and cause the control device 30 to set the indication value.

In the present embodiment, the control device 30 may set a predetermined value (recommended value) corresponding to one option as the target charge amount, in response to a predetermined input for selecting the one option from among a plurality of predefined options.

This enables the shovel user to specifically set a recommended value corresponding to one option to the shovel 200 as a target charge amount in the form of selecting a desired one option from a plurality of options automatically prepared.

In the present embodiment, the display device 50A may display the setting screen 4000, which is operable by a user, according to an input from the input device 52. A plurality of optional icons 4311 to 4313 corresponding to a plurality of options selectable by operation from the input device 52 may be displayed on the setting screen 4000.

This enables the shovel user to select one of the optional icons 4311 to 4313 on the setting screen 4000 to specifically indicate a recommended value corresponding to one option as a target charge amount, and cause the control device 30 to set the indication value.

Further, in the present embodiment, the control device 30 may determine a recommended value for the target charge amount based on at least one of data relating to the actual value of the discharge amount of the power storage device 19, data relating to the date and time when the next work is performed by the shovel 200, data relating to the environmental conditions of the work site of the shovel 200, data relating to the position of the shovel 200, or data relating to the deteriorated state of the power storage device 19.

This enables the shovel 200 to specifically determine (calculate) a recommended value for each of a plurality of options on a per plurality of options basis.

In the present embodiment, the recommended value may be defined within at least one of the following ranges: a range such that the charge amount is less than or equal to a predetermined upper limit value, which is lower than the charge amount corresponding to the full charge of the power storage device 19, and a range such that the charge amount greater than or equal to a predetermined lower limit value remains in the power storage device 19, at the end of the work of the shovel 200.

This enables the shovel 200 to determine the recommended value for the target charge amount in consideration of the deteriorated state of the power storage device 19.

In the present embodiment, the output device 50 (display device 50A) may output to the shovel user an estimated value of at least one of a time required for charging the power storage device 19 up to the target charge amount (estimated required charge time) and an operable time of the shovel 200 (estimated operating time).

This enables the shovel user to give an indication relating to the target charge amount to the shovel 200 through the input device 52 while confirming the estimated required charge time and the estimated operating time.

In the present embodiment, the storage part 3004 may store a log relating to the target charge amount set by the control device 30 (target charge amount setting part 3007). Under the control of the control device 30 (screen display processing part 3001), the display device 50A may display logs relating to previous charges that have already been completed or a current charge that is being performed in progress.

This enables the shovel user to check the setting contents relating to the target charge amount setting function that have previously been completed or the setting contents relating to the target charge amount setting function for charging that is currently performed in progress.

The control device 30 may be configured to provide a voice assistant to a shovel user through the sound output device 50B, for example, and to allow the shovel user to set the target charge amount of the power storage device 19 through an interactive interface.

<Configuration of Target Charge Amount Setting Function of Management Device>

As illustrated in FIG. 3, the control device 310 includes a screen display processing part 3101, a storage part 3102, a recommended value calculation part 3103, an operating time estimation part 3104, a target charge amount setting request part 3105, an additional charge amount calculation part 3106, a required charge time estimation part 3107, a notification part 3108, and a log recording part 3109.

The screen display processing part 3101 causes the output device 330 (display device) to display a screen relating to the target charge amount setting function.

For example, the screen display processing part 3101 causes the output device 330 (display device) to display a setting screen for allowing a management device user to give an indication relating to the target charge amount to cause the control device 310 to set the target charge amount. When a predetermined input is received from the management device user through the input device 340, the screen display processing part 3101 may shift the display contents of the output device 330 (display device) to the target charge amount setting screen. For example, the screen display processing part 3101 may cause the output device 330 (display device) to display a setting screen (setting screen 4000) relating to the target charge amount of the power storage device 19 similar to that illustrated in FIG. 4. Thus, the management device user can cause the shovel 200 (control device 30) to set the target charge amount through the control device 310 by operating the target charge amount setting screen using the input device 340.

The screen display processing part 3101 causes the output device 330 (display device) to display, for example, a confirmation screen relating to the progress of deterioration of the power storage device 19. When a predetermined input is received from the management device user through the input device 340, the screen display processing part 3101 may shift the display contents of the output device 330 (display device) to a confirmation screen relating to the progress of deterioration of the power storage device 19. For example, the screen display processing part 3101 may display a confirmation screen (confirmation screen 5000) similar to that illustrated in FIG. 5 on the output device 330 (display device). Thus, the management device user can confirm, through the confirmation screen relating to the progress of the deterioration of the power storage device 19, that the progress of the deterioration of the power storage device 19 is reduced by the target charge amount setting function.

The screen display processing part 3101 displays, for example, a confirmation screen relating to charging results and charging statuses of the power storage device 19, more specifically, a confirmation screen relating to charging logs based on the target charge amount setting function of the power storage device 19. When a predetermined input is received from the management device user through the input device 340, the screen display processing part 3101 may shift the display contents of the output device 330 (display device) to the confirmation screen presenting logs relating to charging based on the target charge amount setting function of the power storage device 19. For example, the screen display processing part 3101 may cause the output device 330 (display device) to display a confirmation screen (confirmation screen 5000) similar to that illustrated in FIG. 6. This enables the management device user to identify the previous results of charging of the power storage device 19, which are obtained from the target charge amount that has been set in advance by the target charge amount setting function through the confirmation screen presenting the logs based on the target charge amount setting function of the power storage device 19.

Further, the management device user can identify information relating to charging in progress, or scheduled charging after the target charge amount is set by the target charge amount setting function through the confirmation screen presenting the logs based on the target charge amount setting function of the power storage device 19.

The screen display processing part 3101 may display a setting screen or a confirmation screen on the output device 330 (display device) on a per plurality of shovels 200 basis. In this case, the screen display processing part 3101 may cause the output device 330 (display device) to display a screen (shovel selection screen) for a management device user to select, from among the plurality of shovels 200, one shovel 200 for which the target charge amount is to be set. The screen display processing part 3101 may cause the output device 330 (display device) to display, on the shovel selection screen, a setting screen relating to the target charge amount of the power storage device 19 of the shovel 200 selected by a predetermined input from the management device user via the input device 340. Similarly, the screen display processing part 3101 may cause the output device 330 (display device) to display a shovel selection screen for a management device user to select, from among the plurality of shovels 200, one shovel 200 to be checked for the progress of deterioration of the power storage device 19. The screen display processing part 3101 may cause the output device 330 (display device) to display, on the shovel selection screen, a confirmation screen relating to the progress of deterioration of the power storage device 19 of the shovel 200 selected by a predetermined input from the management device user via the input device 340. Similarly, the screen display processing part 3101 may cause the output device 330 (display device) to display a shovel selection screen for the management device user to select, from among a plurality of shovels 200, one shovel 200 to be checked for a charging result and charging status of the power storage device 19. The screen display processing part 3101 may cause the output device 330 (display device) to display, on the shovel selection screen, a confirmation screen relating to the charging result and charging status of the power storage device 19, that is, a confirmation screen relating to the charging log based on the target charge amount setting function of the power storage device 19, for the shovel 200 selected by a predetermined input from the management device user through the input device 340. This enables a management device user to set the target charge amount on a per plurality of shovels 200 basis through the control device 310, or to confirm the progress of deterioration of the power storage device 19, the charging result, the charging state, and the like on a per plurality of shovels 200 basis.

The screen display processing part 3101 may cause the support device 400 (output device 430) to display a screen relating to the target charge amount setting function based on intercommunication with the support device 400 through the communication device 320. Details will be described later.

The storage part 3102 stores data relating to the target charge amount of the power storage device 19 received from the shovel 200 by the communication device 320.

The recommended value calculation part 3103 calculates a recommended value for the target charge amount in the automatic setting mode, as in the case of the recommended value calculation part 3005 of the shovel 200. Specifically, the recommended value calculation part 3103 may calculate a recommended value for the target charge amount using data received from the shovel 200 and stored in the storage part 3102.

The operating time estimation part 3104 estimates an operating time of the shovel 200 for charging the power storage device 19 up to a set target charge amount, and acquires (calculates) the estimated operating time. For example, in the case of the manual setting mode, as in the case of the operating time estimation part 3006, the operating time estimation part 3104 may calculate an estimated operating time for charging the power storage device 19 up to a content (indication value) indicated by the target charge amount setting screen. For example, in the automatic setting mode, as in the case of the operating time estimation part 3006, the operating time estimation part 3104 may calculate an estimated operating time for charging the power storage device 19 up to a recommended value corresponding to a selected optional icon in the optional icon group of the target charge amount setting screen. Thus, the screen display processing part 3101 can display the estimated operating time on the target charge amount setting screen to notify the management device user of the estimated operating time.

The target charge amount setting request part 3105 sets the target charge amount of the power storage device 19, in response to a predetermined input received by the input device 340, and transmits a signal (hereinafter referred to as "request signal") including the set content to the shovel 200 through the communication device 320. For example, when an icon corresponding to the target charge amount determination icon 4520 in FIG. 4 is operated through the input device 340 on the target charge amount setting screen, the target charge amount setting request part 3105 sets the indicated content (indication value or recommended value) on the target charge amount setting screen to the target charge amount of the power storage device 19. The target charge amount setting request part 3105 may send a request signal to the shovel 200 requesting that the setting contents be set to the target charge amount of the power storage device 19. Thus, the control device 310 can cause the shovel 200 (the control device 30) to set the target charge amount of the power storage device 19, in response to a predetermined input by the management device user through the input device 340.

As in the case of the additional charge amount calculation part 3008, the additional charge amount calculation part 3106 calculates a current charge amount of the power storage device 19, and calculates the additional charge amount with respect to the set target charge amount when charging is started from the current state of the power storage device 19. Specifically, the additional charge amount calculation part 3106 may calculate the current charge amount of the power storage device 19 based on the detection data of the power storage device 19 received from the shovel 200 and stored in the storage part 3102, and calculate the additional charge amount based on the calculated current charge amount of the power storage device 19.

As in the case of the required charge time estimation part 3009, the required charge time estimation part 3107 estimates the required time for charging the power storage device 19 to the set target charge amount, and calculates the estimated required charge time. For example, in the case of the manual setting mode, the required charge time estimation part 3107 may calculate the estimated required charge time for charging the power storage device 19 up to reaching the content (indication value) indicated by the target charge amount setting screen. For example, in the automatic setting mode, the required charge time estimation part 3107 may calculate an estimated required charge time for charging the power storage device 19 up to reaching a recommended value corresponding to a selected optional icon in the optional icon group of the target charge amount setting screen. In the automatic setting mode, the required charge time estimation part 3107 may calculate the estimated required charge time required for charging the power storage device 19 up to a recommended value corresponding to each of all the optional icons including the selected optional icon in the optional icon group of the target charge amount setting screen. Thus, the screen display processing part 3101 displays an estimated required charge time on the target charge amount setting screen to notify the management device user thereof. Further, the required charge time estimation part 3107 may calculate, for example, at least one of a case of charging in the normal charging mode and a case of charging in the rapid charging mode. Thus, the screen display processing part 3101 can display the estimated required charge time on the target charge amount setting screen to notify the management device user of the estimated required charge time in such a manner as to distinguish between the case where the power storage device 19 is charged in the normal charging mode and the case where the power storage device 19 is charged in the rapid charging mode.

The notification part 3108 notifies the user of the target charge amount setting function of the power storage device 19. The user is a shovel user, a management device user, or a support device user who uses the target charge amount setting function of the power storage device 19 through the shovel 200, the management device 300, or the support device 400. Specifically, the notification part 3108 may send a notification email relating to the target charge amount setting function of the power storage device 19 to an email address of a user registered in advance. The notification part 3108 may also send a notification relating to the target charge amount setting function of the power storage device 19 to a user's social networking service (SNS) account registered in advance. Further, the notification part 3108 may send a push notification relating to the target charge amount setting function of the power storage device 19 to a user's terminal device (e.g., support device 400) registered in advance.

For example, when a notification signal indicating that the setting of the target charge amount of the power storage device 19 based on the request signal has been completed is received from the shovel 200 through the communication device 320, the notification part 3108 may notify a user using the target charge amount setting function of the power storage device 19 that the setting of the target charge amount has been completed. In this case, the notification part 3108 may also notify the user of setting contents (target charge amount, setting mode, charging mode, etc.).

For example, when a notification signal indicating the completion of charging of the power storage device 19 is received from the shovel 200 through the communication device 320, the notification part 3108 may notify a user, who has used the target charge amount setting function of the power storage device 19, of the completion of charging of the power storage device 19. In this case, the notification part 3108 may request the user completion of a questionnaire relating to the target charge amount setting function of the power storage device 19. The questionnaire includes questions about the interface of the target charge setting function, questions about work after charging based on the target charge amount set by the target charge setting function, and the like. Thus, the management device 300 can be used to improve the target charge amount setting function by performing machine learning or the like on the basis of the answer contents of the questionnaire received through the communication device 320.

As in the case of the log recording part 3013, a log recording part 3109 records a log relating to charging based on the target charge amount setting function of the power storage device 19 in the storage part 3102, on a per plurality of shovels 200 basis. Specifically, the log recording part 3013 records in the storage part 3102 various kinds of information generated in the process until the target charge amount is set by the target charge amount setting function of the power storage device 19 and the charging of the power storage device 19 is completed. For each time at which the target charge amount is set by the target charge amount setting function of the power storage device 19 and the charging of the power storage device 19 is performed, a record corresponding to a log is created and the created record is stored in a storage part 3102. The record stores, for example, "date", "charging time period", "charging mode", "setting mode", "target charge amount", "previous discharge amount", and "deterioration degree" displayed in the display area 6100 of the confirmation screen 6000. As a result, a record group, that is, a database, of logs relating to charging based on the target charge amount setting function of the power storage device 19 is constructed in the storage part 3102. Therefore, the screen display processing part 3101 can cause the output device 330 (display device) to display a confirmation screen of logs relating to charging based on the target charge amount setting function of the power storage device 19 by referring to the database of the logs relating to charging based on the target charge amount setting function of the power storage device 19 stored in the storage part 3102. Similarly, the screen display processing part 3101 can cause the support device 400 (output device 430) to display a confirmation screen of logs relating to charging based on the target charge amount setting function of the power storage device 19 by referring to the database of the logs relating to charging based on the target charge amount setting function of the power storage device 19 stored in the storage part 3102.

As described above, in the present embodiment, the target charge amount setting request part 3105 (an example of the setting part) sets a target value (target charge amount) of the charge amount of the power storage device 19 by the power supplied from the external power source in response to a predetermined input received by the input device 340 (an example of the input part). Then, the communication device 320 (an example of the communication part) transmits the target charge amount set by the target charge amount setting request part 3105 to the shovel 200.

Thus, the management device 300 (an example of the information processing apparatus) can limit the charge amount after the power storage device 19 is charged with the power from the external power source to the target charge amount indicated by the management device user, in response to the input from the management device user. Hence, the management device user can, for example, set the target charge amount at the shovel 200 according to the content of the next work, and avoid a situation in which the excess electric power is left at the end of the work or the charge amount of the power storage device 19 does not last until the end of the work. Therefore, in the shovel 200, the management device 300 can more appropriately charge the power storage device 19 capable of being charged with the power from the external power source.

In the present embodiment, upon receiving from the shovel 200 the notification of the completion of setting of the target charge amount in the shovel 200, the communication device 320 may send the notification of the completion of setting of the target charge amount to the email address of the user, the account of the social network service of the user, or the terminal device of the user (e.g., support device 400).

Thus, the user (management device user and support device user) can confirm that the setting of the target charge amount of the power storage device 19 performed through the management device 300 and the support device 400 is reflected on the shovel 200 side.

In the present embodiment, the log recording part 3109 may record a log relating to the target charge amount set by the target charge amount setting request part 3105 in the storage part 3102. The screen display processing part 3101 may cause the output device 330 (display device) to display the logs relating to the previous charges that have already been completed or the current charge that is being performed.

Thus, the management device user can check the setting contents relating to the target charge amount setting function that have previously been completed or the setting contents relating to the target charge amount setting function for the charge that is currently in progress.

In the present embodiment, the log recording part 3109 may record a log relating to the target charge amount set by the target charge amount setting request part 3105 in the storage part 3102. Then, the screen display processing part 3101 may cause the communicatively connected support device 400 (output device 430) to display logs relating to the previous charges that have already been completed or a log relating to the current charge that is being performed in progress.

This enables the support device user to check the setting contents relating to the target charge amount setting function that have previously been completed or the setting contents relating to the target charge amount setting function for the charge that is currently in progress.

The control device 310 may be configured to provide a voice assistant to the management device user through, for example, a sound output device included in the output device 330, and to allow the management device user to set the target charge amount of the power storage device 19 through an interactive interface.

<Configuration of Target Charge Amount Setting Function of Support Device>

As illustrated in FIG. 3, the control device 410 includes a screen display processing part 4101 and a target charge amount setting request part 4102.

The screen display processing part 4101 causes the output device 430 (display device) to display a screen relating to the target charge amount setting function.

For example, when the support device user indicates the target charge amount, the screen display processing part 4101 causes the output device 430 (display device) to display a setting screen for the control device 410 to set the target charge amount. When a predetermined input is received from the support device user through the input device 440, the screen display processing part 4101 may shift the display content of the display device to a setting screen relating to the target charge amount of the power storage device 19. For example, the screen display processing part 4101 may display a target charge amount setting screen (setting screen 4000) similar to that of FIG. 4 on the output device 430 (display device). Thus, the support device user can cause the shovel 200 (control device 30) to set the target charge amount through the control device 410 by operating the target charge amount setting screen of the support device 400 (output device 430) using the input device 440.

Specifically, the screen display processing part 4101 may perform intercommunication with the management device 300 (control device 310) through the communication device 420 to acquire data relating to the contents (e.g., estimated operating time, estimated required charge time, etc.) to be displayed on the setting screen, which relates to the target charge amount of the power storage device 19. Thus, the screen display processing part 4101 can display the target charge amount setting screen on the output device 430 (display device) under the control of the management device 300. Under the control of the management device 300, the screen display processing part 4101 can display the estimated operating time, the estimated required charge time, and the like on the target charge amount setting screen and notify the support device user thereof.

The screen display processing part 4101 causes the output device 430 (display device) to display, for example, a confirmation screen relating to the progress of deterioration of the power storage device 19. When a predetermined input is received from the support device user through the input device 440, the screen display processing part 4101 may shift the display content of the output device 430 (display device) to the confirmation screen relating to the progress of deterioration of the power storage device 19. For example, the screen display processing part 4101 may display a confirmation screen (confirmation screen 5000) similar to that illustrated in FIG. 5 on the output device 430 (display device). As a result, the support device user can confirm a state in which the progress of the deterioration of the power storage device 19 is reduced by the target charge amount setting function through the confirmation screen relating to the progress of the deterioration of the power storage device 19.

Specifically, the screen display processing part 4101 may perform intercommunication with the management device 300 (control device 310) through the communication device 420 to acquire data relating to the contents to be displayed on the confirmation screen, which relates to the progress of deterioration of the power storage device 19. As a result, the screen display processing part 4101 can display a confirmation screen relating to the progress of the deterioration of the power storage device 19 on the output device 430 (display device) under the control of the management device 300.

The screen display processing part 4101 causes the output device 430 (display device) to display, for example, a confirmation screen relating to the charging result and charging status of the power storage device 19, more specifically, a confirmation screen relating to the charging log based on the target charge amount setting function of the power storage device 19. When a predetermined input is received from a support device user through the input device 440, the screen display processing part 4101 may shift the display content of the display device to a confirmation screen of a log relating to charging based on the target charge amount setting function of the power storage device 19. For example, the screen display processing part 4101 may cause the output device 430 (display device) to display a confirmation screen (confirmation screen 6000) similar to that illustrated in FIG. 6. Thus, the support device user can identify the previous results of charging the power storage device 19 after the target charge amount is set by the target charge amount setting function of the power storage device 19 through the confirmation screen of the log relating to charging based on the target charge amount setting function. Further, the support device user can identify the information relating to charging in progress or scheduled charging after the target charge amount is set by the target charge amount setting function through the confirmation screen of the log based on the target charge amount setting function of the power storage device 19.

As in the case of the screen display processing part 3101 of the management device 300, the screen display processing part 4101 may cause the output device 430 (display device) to display a setting screen or a confirmation screen on a per plurality of shovels 200 basis. In this case, the screen display processing part 4101 may cause the output device 430 (display device) to display a screen (shovel selection screen) for a support device user to select, from among the plurality of shovels 200, one shovel 200 for which the target charge amount is to be set. The screen display processing part 4101 may cause the output device 430 (display device) to display, on the shovel selection screen, a setting screen relating to one shovel 200 selected by a predetermined input from the support device user through the input device 440. Similarly, the screen display processing part 4101 may cause the output device 430 (display device) to display a shovel selection screen for a support device user to select, from among the plurality of shovels 200, one shovel 200 to be checked for the deterioration reduction state of the power storage device 19. The screen display processing part 4101 may cause the output device 430 (display device) to display, on the shovel selection screen, a deterioration reduction state confirmation screen for one shovel 200 selected by a predetermined input from the support device user through the input device 440. Similarly, the screen display processing part 4101 may cause the output device 430 (display device) to display a shovel selection screen for a support device user to select, from among the plurality of shovels 200, one shovel 200 to be checked for the charging result and charging status of the power storage device 19. The screen display processing part 4101 may cause the output device 430 (display device) to display, on the shovel selection screen, a confirmation screen relating to the charging result and charging status of the power storage device 19, which is a confirmation screen relating to the charging log based on the target charge amount setting function of the power storage device 19, for the shovel 200 selected by a predetermined input from the support device user through the input device 440. This enables a support device user to set the target charge amount on a per plurality of shovels 200 basis through the control device 410, and to confirm the progress of deterioration, charging result, charging state, and the like of the power storage device 19 on a per plurality of shovels 200 basis.

The target charge amount setting request part 4102 sets a target charge amount of the power storage device 19, in response to a predetermined input received by the input device 440, and transmits a request signal including the set content to the shovel 200. The target charge amount setting request part 4102 may directly transmit a request signal to the shovel 200 through the communication device 420, or may transmit a request signal to the management device 300 and cause the management device 300 to transfer the request signal to the shovel 200. For example, when an icon corresponding to the target charge amount determination icon 4520 in FIG. 4 is operated through the input device 440 on the target charge amount setting screen, the target charge amount setting request part 4102 sets an indicated content (indication value or recommended value) on the target charge amount setting screen to the target charge amount of the power storage device 19. The target charge amount setting request part 4102 may send to the shovel 200 a request signal for setting the set content to the target charge amount of the power storage device 19. This enables the control device 410 to cause the shovel 200 (the control device 30) to set the target charge amount of the power storage device 19, in response to the predetermined input of the support device user through the input device 440.

As described above, in the present embodiment, the target charge amount setting request part 4102 (an example of the setting part) sets a target value (target charge amount) of the charge amount of the power storage device 19 with the power supplied from the external power source, in response to a predetermined input received by the input device 440 (an example of the input part). Then, the communication device 420 (an example of the communication part) transmits the target charge amount set by the target charge amount setting request part 4102 to the shovel 200.

Thus, the support device 400 (an example of the information processing apparatus) can limit the charge amount of the power storage device 19 after being charged with the power from the external power source to the target charge amount indicated by the support device user, in response to the input from the support device user. Thus, the support device user enables, for example, the shovel 200 to set the target charge amount at according to the content of the next work to avoid a situation in which the excess electric power is left at the end of the work or the charge amount of the power storage device 19 does not last until the end of the work. Therefore, the support device 400 can more appropriately charge the power storage device 19 chargeable with power from the external power source in the shovel 200.

In the present embodiment, the screen display processing part 4101 may acquire data relating to logs relating to previous charges that have already been completed or a log relating to a current charge that is currently being performed from the management device 300, and cause the output device 430 (display device) to display the logs relating to the previous charges that have already been completed or the log relating to the current charge that is currently being performed.

Thus, the support device user can thereafter check the setting contents relating to the target charge amount setting function that have been previously completed or the setting contents relating to the target charge amount setting function for the charge that is currently in progress.

The control device 410 may be configured to provide a voice assistant to the management device user through, for example, a sound output device included in the output device 430, and to allow the support device user to set the target charge amount of the power storage device 19 through an interactive interface.

Modification/Alteration

Although the embodiments have been described in detail above, the present disclosure is not limited to the specific embodiments, and various modifications and alterations are possible within the scope of the gist of the claims.

For example, in the above-described embodiments, the target charge amount setting function of the power storage device 19 installed in the shovel 200 has been described, but the same function may be applied to other work machines that install the power storage device chargeable with power from an external power source. Other work machines may include, for example, transportation machines such as forklifts and cranes, construction machines such as bulldozers, agricultural machines such as combines, forestry machines such as harvesters, and the like.

According to the above-described embodiments, a power storage device can be more appropriately charged in a shovel driven by the power storage device, which can be charged by power from an external power source.

DESCRIPTION OF THE REFERENCE NUMERALS

1 lower traveling body
1A,1B lower traveling hydraulic motor (hydraulic actuator)
3 upper turning body
4 boom
5 arm
6 bucket
7 boom cylinder (hydraulic actuator)
8 arm cylinder (hydraulic actuator)
9 bucket cylinder (hydraulic actuator)
12 electric pump motor (electric motor)
14 main pump (hydraulic pump)
15 pilot pump
18 inverter unit
18A inverter
18B inverter
19 power storage device
21 turning motor
26 operating device
30 control device
30A-30D controller
44 DC-DC converter
46 battery
50 output device
52 input device
130 in-vehicle charger
200 shovel
300 management device
320 communication device (communication part)
330 output device
340 input device (input part)
400 support device
420 communication device (communication part)
430 output device
440 input device (input part)
3001 screen display processing part
3007 target charge amount setting part
3101 screen display processing part
3105 target charge amount setting request part (setting part)
4101 screen display processing part
4102 target charge amount setting request part (setting part)

The invention claimed is:

1. A shovel comprising:
a hydraulic pump;
a hydraulic actuator configured to be driven by hydraulic fluid supplied from the hydraulic pump;
an electric motor configured to drive the hydraulic pump;
a power storage device configured to be charged with power from an external power source to supply driving power to the electric motor;
an input device configured to receive an input from a user;
a display; and
a hardware processor configured to
set a target charge amount up to which the power storage device is charged with the power from the external power source during charging of the power storage device, in response to a predetermined input received by the input device, and
display, simultaneously on a same screen on the display, an actual transition of deterioration of the power storage device due to the charging of the power storage device and a predicted transition of deterioration of the power storage device based on an assumption that the power storage device is charged up to the target charge amount set by the hardware processor every time the power storage device is charged.

2. The shovel according to claim 1, wherein the input device directly receives the input from the user, the user being inside a cabin or around the shovel.

3. The shovel according to claim 1, wherein the input device is a communication device configured to receive, from a predetermined external device, a signal corresponding to the input from the user.

4. The shovel according to claim 1, wherein the hardware processor is further configured to
display, on the display, a screen operable by the user, according to an input from the input device, the screen displaying an image whose shape is changeable by operation from the input device, and set a specific value represented by the shape of the image to the target charge amount, the specific value being set on the screen in response to the predetermined input.

5. The shovel according to claim 1, wherein
the hardware processor is configured to determine a plurality of recommended options relating to the target charge amount, based on data relating to an actual value of a discharge amount of the power storage device, and set a predetermined value corresponding to one option to the target charge amount, in response to the predetermined input for selecting the one option from among the plurality of recommended options.

6. The shovel according to claim 1, wherein
the hardware processor is configured to determine a plurality of recommended options relating to the target charge amount, based on data relating to date and time when a next work is performed by the shovel, and set a predetermined value corresponding to one option to the target charge amount, in response to the predetermined input for selecting the one option from among the plurality of recommended options.

7. The shovel according to claim 1, wherein
the hardware processor is configured to determine a plurality of recommended options relating to the target charge amount, based on data relating to environmental conditions of a work site of the shovel, and set a predetermined value corresponding to one option to the target charge amount, in response to the predetermined input for selecting the one option from among the plurality of recommended options.

8. The shovel according to claim 1, wherein
the hardware processor is configured to determine a plurality of recommended options relating to the target charge amount, based on data relating to a position of the shovel, and set a predetermined value corresponding to one option to the target charge amount, in response to the predetermined input for selecting the one option from among the plurality of recommended options.

9. The shovel according to claim 1, wherein
the hardware processor is configured to determine a plurality of recommended options relating to the target charge amount, based on data relating to a deteriorated state of the power storage device, and set a predetermined value corresponding to one option to the target charge amount, in response to the predetermined input for selecting the one option from among the plurality of recommended options.

10. The shovel according to claim 1, wherein
the hardware processor is configured to display, on the display, an estimated value of a time required for charging the power storage device up to the target charge amount.

11. The shovel according to claim 1, wherein
the hardware processor is configured to display, on the display, an estimated value of an operable time of the shovel when the power storage device is charged up to the target charge amount.

12. The shovel according to claim 1, further comprising:
a storage configured to store a log relating to charging of the power storage device set by the hardware processor based on the target charge amount,
wherein the hardware processor is configured to display, on the display, the log relating to previous charging that has already been completed, the log relating to current charging in progress, or the log relating to scheduled charging yet to be started.

13. The shovel according to claim 1, wherein the hardware processor is configured to
generate and display a screen for setting the target charge amount, the screen including a first area for manually inputting the target charge amount through the input device and a second area for selecting an option from among a plurality of options representing respective recommended values for the target charge amount through the input device,
enable the first area or the second area as selected through the input device in the displayed screen, and
set the manually input target charge amount when the first area is enabled, and set the target charge amount corresponding to the selected option when the second area is enabled.

14. The shovel according to claim 13, wherein the hardware processor is configured to display a bar graph indicating the set target charge amount in the first area and selectably display a plurality of icons corresponding to the plurality of options in the second area, the bar graph and the plurality of icons being spaced apart from each other in the screen.

15. The shovel according to claim 1, wherein the hardware processor is configured to display, simultaneously on the same screen on the display, the actual transition of deterioration of the power storage device, the predicted transition of deterioration of the power storage device, and another predicted transition of deterioration of the power storage device based on an assumption that the power storage device is fully charged every time the power storage device is charged.

16. An information processing apparatus comprising:
a communication device configured to communicate with an outside, the outside including a shovel including a hydraulic pump, a hydraulic actuator configured to be driven by hydraulic oil supplied from the hydraulic pump, an electric motor configured to drive the hydraulic pump, and a power storage device configured to be charged with power from an external power source to supply driving power to the electric motor;
an input device configured to receive a predetermined input from a user;
a display; and
a hardware processor configured to
set a target charge amount up to which the power storage device is charged with the power from the external power source during charging of the power storage device, in response to the predetermined input received from the input device, and
display, simultaneously on a same screen on the display, an actual transition of deterioration of the power storage device due to the charging of the power storage device and a predicted transition of deterioration of the power storage device based on an assumption that the power storage device is charged up to the target charge amount set by the hardware processor every time the power storage device is charged,
wherein the communication device is configured to transmit the set target charge amount to the shovel.

17. The information processing apparatus according to claim 16, wherein the communication device is configured to transmit, upon receiving from the shovel a notification of completion of setting of the target charge amount in the shovel, the received notification to an email address of the user, an account of a social network service of the user, or a predetermined terminal device of the user.

18. A non-transitory computer-readable recording medium storing a program for causing a hardware processor of an information processing apparatus to execute a process, the information processing apparatus including a communication device configured to communicate with an outside, an input device configured to receive a predetermined input from a user, a display, and the hardware processor, the outside including a shovel including a hydraulic pump, a hydraulic actuator configured to be driven by hydraulic oil supplied from the hydraulic pump, an electric motor configured to drive the hydraulic pump, and a power storage device configured to be charged with power from an external power source to supply driving power to the electric motor, the process including:

setting a target charge amount up to which the power storage device is charged with the power from the external power supply during charging of the power storage device, in response to the predetermined input received from the input device;

transmitting the set target charge amount to the shovel through the communication device; and displaying, simultaneously on a same screen on the display, an actual transition of deterioration of the power storage device due to the charging of the power storage device and a predicted transition of deterioration of the power storage device based on an assumption that the power storage device is charged up to the set target charge amount every time the power storage device is charged.

\* \* \* \* \*